US011656339B2

United States Patent
Chen et al.

(10) Patent No.: US 11,656,339 B2
(45) Date of Patent: May 23, 2023

(54) SYSTEM AND METHODS FOR SYNCHRONIZING ROTATION OF MULTIPLE MIRRORS

(71) Applicant: Beijing Voyager Technology Co., Ltd., Beijing (CN)

(72) Inventors: Zuow-Zun Chen, Mountain View, CA (US); Jihua Li, Mountain View, CA (US); Lingkai Kong, Mountain View, CA (US); Youmin Wang, Mountain View, CA (US); Yue Lu, Mountain View, CA (US); Quin Zhou, Mountain View, CA (US)

(73) Assignee: Beijing Voyager Technology Co., Ltd., Beijing (CN)

( * ) Notice: Subject to any disclaimer, the term of this patent is extended or adjusted under 35 U.S.C. 154(b) by 1036 days.

(21) Appl. No.: 16/290,782

(22) Filed: Mar. 1, 2019

(65) Prior Publication Data

US 2020/0278427 A1 Sep. 3, 2020

(51) Int. Cl.
*G01S 7/481* (2006.01)
*G02B 26/08* (2006.01)
(Continued)

(52) U.S. Cl.
CPC ............ *G01S 7/4817* (2013.01); *G01S 7/484* (2013.01); *G01S 17/931* (2020.01); *G02B 26/0841* (2013.01); *G02B 26/10* (2013.01)

(58) Field of Classification Search
CPC ...... G01S 7/4817; G01S 7/484; G01S 17/931; G01S 7/4972; G01S 17/42; G02B 26/0841; G02B 26/10; G02B 26/101
See application file for complete search history.

(56) References Cited

U.S. PATENT DOCUMENTS

2010/0067927 A1* 3/2010 Satoh ................... G02B 26/105
359/204.1
2016/0341955 A1* 11/2016 McVittie .............. G02B 26/101

FOREIGN PATENT DOCUMENTS

CN 104145204 A 11/2014
CN 206258624 U 6/2017
(Continued)

OTHER PUBLICATIONS

International Search Report and Written Opinion for PCT/IB2020/051735, dated May 28, 2020, 8 pages.

*Primary Examiner* — Kimberly N. Kakalec
(74) *Attorney, Agent, or Firm* — Kilpatrick Townsend & Stockton LLP

(57) ABSTRACT

Apparatuses and methods for controlling a micro-mirror are provided. In one example, a controller is coupled with a micro-mirror assembly comprising a micro-mirror, an actuator, and a sensor. The controller is configured to: receive a reference signal including information of a target oscillatory rotation of the micro-mirror; receive, from the sensor, the measurement signal of an oscillatory rotation of the micro-mirror; determine, based on the measurement signal and the information included in the reference signal, a difference between the oscillatory rotation of the micro-mirror and the target oscillatory rotation; receive an input control signal; generate, based on the difference and the input control signal, an output control signal to control at least one of a phase or an amplitude of the oscillatory rotation of the micro-mirror; and transmit the output control signal to the actuator.

20 Claims, 28 Drawing Sheets

(51) Int. Cl.
  *G01S 7/484*  (2006.01)
  *G02B 26/10*  (2006.01)
  *G01S 17/931*  (2020.01)

(56) References Cited

FOREIGN PATENT DOCUMENTS

| | | |
|---|---|---|
| CN | 107646192 A | 1/2018 |
| CN | 108549188 A | 9/2018 |
| JP | 2012058573 A | 3/2012 |

\* cited by examiner

SYSTEM AND METHODS FOR SYNCHRONIZING ROTATION OF MULTIPLE MIRRORS

BACKGROUND

Light steering typically involves the projection of light in a pre-determined direction to facilitate, for example, the detection and ranging of an object, the illumination and scanning of an object, or the like. Light steering can be used in many different fields of applications including, for example, autonomous vehicles, medical diagnostic devices, etc.

Light steering can be performed in both transmission and reception of light. For example, a light steering transmitter may include one or more micro-mirror arrays to control the projection direction of light to detect/image an object. Moreover, a light steering receiver may also include one or more micro-mirror arrays to select a direction of incident light to be detected by the receiver, to avoid detecting other unwanted signals. The micro-mirror array may include an array of micro-mirror assemblies, with each micro-mirror assembly comprising a micro-mirror and an actuator.

In a micro-mirror assembly, a micro-mirror can be connected to a substrate via a connection structure (e.g., a torsion bar, a spring, etc.) to form a pivot, and the micro-mirror can be rotated around the pivot by the actuator. Each micro-mirror can be rotated by a rotation angle to reflect (and steer) light from a light source at a target direction. Each micro-mirror can be rotated by the actuator to provide a first range of angles of projection along a vertical axis and to provide a second range of angles of projection along a horizontal axis. The first range and the second range of angles of projection can define a two-dimensional field of view (FOV) in which light is to be projected to detect/scan an object. The FOV can also define the direction of incident lights, reflected by the object, to be detected by the receiver. In some examples, multiple micro-mirror arrays can be included in the light steering transmitter/receiver to define multiple FOVs at multiple directions, to perform object detection/scanning at those directions. The object detection/scanning results at the multiple directions can then be correlated (e.g., to identify an object that moves through the multiple FOVs).

The micro-mirrors can be operated in a synchronous fashion to define a common FOV, or to synchronize the object detection/scanning operations at multiple directions by the multiple micro-mirror arrays to facilitate correlations among the object detection/scanning operations results in the multiple FOVs. For example, a common control signal can be supplied to the micro-mirrors to synchronize the rotations of the micro-mirrors. However, due to component variations due to precision limitations in the fabrication process, different micro-mirrors can rotate by different angles in response to the same control signal, which can cause the reflected light to disperse and reduce the resolution of the object detection/scanning operation. Moreover, as the object detection/scanning operations by the multiple micro-mirror arrays become less synchronous, it becomes more difficult to correlate the object detection/scanning operations results in the multiple FOVs. Therefore, it is desirable to adapt the control signals for different micro-mirror assemblies to account for the component variations, to improve the uniformity of rotation among the micro-mirrors.

BRIEF SUMMARY

In certain embodiments, an apparatus is provided. The apparatus can be part of a Light Detection and Ranging (LiDAR) module of a vehicle. The apparatus comprises a semiconductor integrated circuit comprising a microelectromechanical system (MEMS) and a controller. The MEMS comprises an micro-mirror assembly. The micro-mirror assembly comprises: a rotatable micro-mirror connected to a substrate and configured to perform at least one of: reflect light from a light source along an output projection path, or reflect input light propagating along an input collection path to a receiver; an actuator controllable by the controller configured to cause the micro-mirror to perform an oscillatory rotation; and a sensor configured to generate a measurement signal corresponding to the oscillatory rotation of the micro-mirror. The controller is coupled with the micro-mirror assembly and configured to: receive a reference signal including information of a target oscillatory rotation of the micro-mirror; receive, from the sensor, the measurement signal of an oscillatory rotation of the micro-mirror; determine, based on the measurement signal and the information included in the reference signal, a difference between the oscillatory rotation of the micro-mirror and the target oscillatory rotation; receive an input control signal that sets a phase and an amplitude of the oscillatory rotation of the micro-mirror; generate, based on the difference and the input control signal, an output control signal associated with at least one of a phase or an amplitude of the oscillatory rotation of the micro-mirror; and transmit the output control signal to the actuator, wherein the transmission of the output control signal enables the actuator to adjust at least one of the phase or the amplitude of the oscillatory rotation of the micro-mirror.

In some aspects, the controller comprises a phase controller, the phase controller comprising: a phase detector configured to determine a phase difference between the reference signal and the measurement signal; a low pass filter configured to output a control voltage representing the phase difference; and a voltage controlled delay line (VCDL) coupled with the low pass filter. The VCDL is configured to: configure a signal delay based on the control voltage, and generate the output control signal based on introducing the signal delay to the input control signal.

In some aspects, the low pass filter comprises a charge pump and a capacitor, the charge pump configured to add a quantity charge to the capacitor or to leak charge from the cap based on a polarity of the phase difference, a quantity of charge added or leaked being based on a magnitude of the phase difference. The control voltage is developed at the capacitor.

In some aspects, the input control signal is generated based on a reference control signal from a phase lock loop (PLL) at a target resonant frequency of the micro-mirror.

In some aspects, the micro-mirror has a resonant frequency different from the target resonant frequency.

In some aspects, the controller comprises an amplitude controller configured to: determine, from the measurement signal, an amplitude of the oscillatory rotation; determine, from the reference signal, a target amplitude of the target oscillatory rotation; determine an amplitude difference between the amplitude and the target amplitude; and generate the output control signal based on adjusting at least one of a duty cycle or an amplitude of the input control signal.

In some aspects, the controller comprises a phase controller and an amplitude controller. The phase controller is configured to: determine a phase difference between the reference signal and the measurement signal, and generate an intermediate control signal based on introducing a delay based on the phase difference to the input control signal. The amplitude controller is configured to: determine, based on the reference signal and the measurement signal, a amplitude difference between the oscillatory rotation and the target oscillatory rotation; and determine the output control signal based on adjusting at least one of adjusting at least one of a duty cycle or an amplitude of the intermediate control signal.

In some aspects, the amplitude controller is configured not to adjust the duty cycle or the amplitude of the intermediate control signal until the phase difference falls within a pre-determined range.

In some aspects, the controller comprises a phase controller and an amplitude controller. The amplitude controller is configured to: determine, based on the reference signal and the measurement signal, a amplitude difference between the oscillatory rotation and the target oscillatory rotation; and determine an intermediate control signal based on adjusting at least one of adjusting at least one of a duty cycle or an amplitude of the input control signal. The phase controller is configured to: determine a phase difference between the reference signal and the measurement signal, and generate the output control signal based on introducing a delay based on the phase difference to the intermediate control signal.

In some aspects, the phase controller is configured not to introduce the delay based on the phase difference to the intermediate control signal until the amplitude difference falls within a pre-determined range.

In some aspects, the sensor comprises an optical sensor configured to: receive light reflected from the micro-mirror when the micro-mirror rotates by a first rotation angle, and output a pulse responsive to receiving the light. The measurement signal comprises the pulses output by the optical sensor at different times.

In some aspects, the controller is configured to: determine a phase difference between the pulses and the reference signal; and generate, based on the phase difference and the input control signal, the output control signal to control the phase of the oscillatory rotation of the micro-mirror.

In some aspects, the controller is configured to: determine an amplitude of the oscillatory rotation based on a time difference between pairs of the pulses; determine, based on the reference signal, an amplitude difference between the amplitude and a target amplitude of the target oscillatory rotation; and generate, based on the amplitude difference and the input control signal, the output control signal to control the phase of the oscillatory rotation of the micro-mirror.

In some aspects, a capacitance of the actuator varies with an angle of rotation of the micro-mirror. The sensor is configured to generate the measurement signal based on measuring the capacitance of the actuator.

In some aspects, the actuator comprises a transimpedance amplifier, the transimpedance amplifier including a feedback resistor and configured to generate the measurement signal based on a relationship between an impedance of the capacitance of the actuator and a resistance of the feedback resistor.

In some aspects, the controller is a first controller; the measurement signal is a first measurement signal; the difference is a first difference; the output control signal is a first output control signal; the micro-mirror assembly is a first micro-mirror assembly; the MEMS comprises a micro-mirror assembly array comprising the first micro-mirror assembly and a second micro-mirror assembly, and the second micro-mirror assembly comprising a second rotatable micro-mirror, a second actuator, and a second sensor. The apparatus further comprises a second controller coupled with the second micro-mirror assembly and configured to: receive the reference signal; receive, from the second sensor, a second measurement signal of an oscillatory rotation of the second micro-mirror; determine, based on the second measurement signal and the information included in the reference signal, a second difference between the oscillatory rotation of the second micro-mirror and the target oscillatory rotation; receive the input control signal; generate, based on the second difference and the input control signal, a second output control signal to control at least one of a phase or an amplitude of the oscillatory rotation of the second micro-mirror; and transmit the second output control signal to the second actuator.

In some aspects, the micro-mirror assembly is a first micro-mirror assembly. The MEMS comprises a micro-mirror assembly array comprising the first micro-mirror assembly and a second micro-mirror assembly, the second micro-mirror assembly comprising a second rotatable micro-mirror and a second actuator. The controller is configured to transmit the output control signal to the second actuator to control at least one of a phase or an amplitude of the oscillatory rotation of the second micro-mirror.

In some embodiments, a method is provided. The method comprises: receiving a reference signal including information of a target oscillatory rotation of a micro-mirror, the micro-mirror being part of a microelectromechanical system (MEMS) of a Light Detection and Ranging (LiDAR) module of a vehicle; receiving, from a sensor, a measurement signal of an oscillatory rotation of the micro-mirror; determining, based on the measurement signal and the information included in the reference signal, a difference between the oscillatory rotation of the micro-mirror and the target oscillatory rotation; receiving an input control signal that sets a phase and an amplitude of the oscillatory rotation of the micro-mirror; generating, based on the difference and the input control signal, an output control signal; and transmitting the output control signal to an actuator coupled with the micro-mirror, wherein the output control signal controls the actuator to adjust at least one of the phase or the amplitude of the oscillatory rotation of the micro-mirror.

In some aspects, the method further comprises: determining a phase difference between the oscillatory rotation of the micro-mirror and the target oscillatory rotation; determining an amplitude difference between the oscillatory rotation of the micro-mirror and the target oscillatory rotation; and generating the output control signal based on the phase difference and the amplitude difference, wherein the output control signal controls the actuator to set the phase and the amplitude of the oscillatory rotation of the micro-mirror.

In some aspects, the sensor comprises at least one of: an optical sensor, or a transimpedance amplifier that senses a capacitance of the actuator.

BRIEF DESCRIPTION OF THE DRAWINGS

The detailed description is set forth with reference to the accompanying figures.

DETAILED DESCRIPTION

Figure 1:
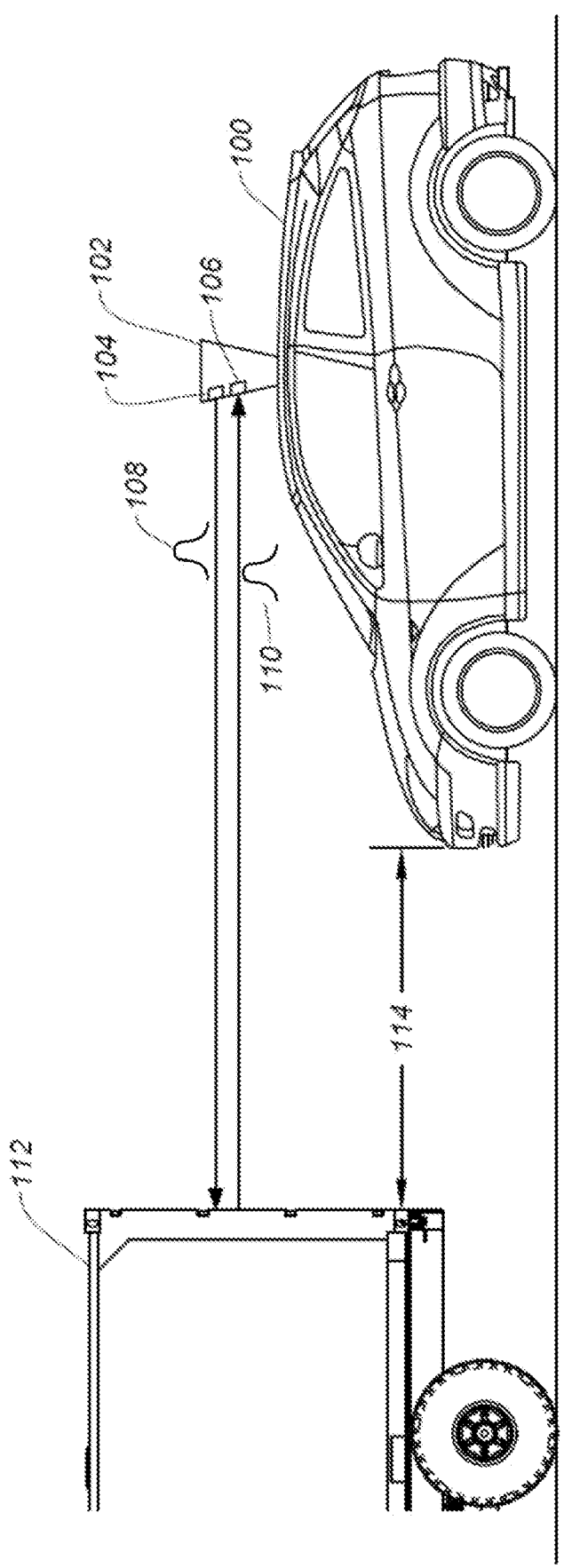
FIG. 1 shows an autonomous driving vehicle utilizing aspects of certain embodiments of the disclosed techniques herein.

In the following description, various examples of a mirror assembly and a light steering transmitter system will be described. For purposes of explanation, specific configurations and details are set forth in order to provide a thorough understanding of the embodiments. However, it will be apparent to one skilled in the art that certain embodiments may be practiced or implemented without every detail disclosed. Furthermore, well-known features may be omitted or simplified in order to prevent any obfuscation of the novel features described herein.

Light steering can be found in different applications. For example, a Light Detection and Ranging (LiDAR) module of a vehicle may include a light steering system. The light steering system can be part of the transmitter to steer light towards different directions to detect obstacles around the vehicle and to determine the distances between the obstacles and the vehicle, which can be used for autonomous driving. Moreover, a light steering receiver may also include a micro-mirror array to select a direction of incident light to be detected by the receiver, to avoid detecting other unwanted signals. Further, the head light of a manually-driven vehicle can include the light steering transmitter, which can be controlled to focus light towards a particular direction to improve visibility for the driver. In another example, optical diagnostic equipment, such as an endoscope, can include a light steering transmitter to steer light in different directions onto an object in a sequential scanning process to obtain an image of the object for diagnosis.

Light steering can be implemented by way of one or more micro-mirror arrays. The micro-mirror array can have an array of micro-mirror assemblies, with each micro-mirror assembly having a movable micro-mirror and an actuator (or multiple actuators). The micro-mirrors and actuators can be formed as a microelectromechanical system (MEMS) on a semiconductor substrate which allows integration of the MEMS with other circuitries (e.g., controller, interface circuits, etc.) on the semiconductor substrate. In a micro-mirror assembly, a micro-mirror can be connected to the semiconductor substrate via a connection structure (e.g., a torsion bar, a spring, etc.) to form a pivot. The actuator can rotate the micro-mirror around the pivot, with the connection structure deformed to accommodate the oscillatory rotation. The array of micro-mirrors can receive an incident light beam, and each micro-mirror can be rotated at a common rotation angle to project/steer the incident light beam at a target direction. Each micro-mirror can be rotated around two orthogonal axes to provide a first range of angles of projection along a vertical dimension and to provide a second range of angles of projection along a horizontal dimension. The first range and the second range of angles of projection can define a two-dimensional field of view (FOV) in which light is to be projected to detect/scan an object. The FOV can also define the direction of incident lights, reflected by the object, to be detected by the receiver. In some examples, multiple micro-mirror arrays can be included in the light steering transmitter/receiver to define multiple FOVs at multiple directions, to perform object detection/scanning at those directions. The object detection/scanning results at the multiple directions can then be correlated (e.g., to identify an object that moves through the multiple FOVs).

Compared with using a single mirror that is used to steer the incident light, a micro-mirror array can provide a comparable or even larger aggregate reflective surface area. With a larger reflective surface area, incident light with a larger beam width can be projected onto the micro-mirror array for the light steering operation, which can mitigate the effect of dispersion and can improve the imaging/ranging resolution. Moreover, each individual micro-mirror has a smaller size and mass, which can lessen the burdens on the actuators that control those micro-mirrors and can improve reliability. Further, the actuators can rotate the micro-mirrors by a larger rotation angle for a given torque, which can improve the FOV of the micro-mirror array.

To further reduce driving power and to further improve reliability, the micro-mirrors of a micro-mirror array can be operated in a resonant mode. A control signal can be supplied to a micro-mirror to cause the micro-mirror to perform an oscillatory rotation, in which the micro-mirror rotates back and forth following an oscillatory pattern. The micro-mirror can have a natural frequency of oscillation. Under the resonant mode, the control signal can also oscillate at that natural frequency to cause the micro-mirror to also rotate at that natural frequency. The same control signal can be supplied to each micro-mirror to control the micro-mirrors to rotate in a synchronous fashion. For example, the micro-mirrors can rotate by the same angle towards the same direction simultaneously, and each micro-mirror can have an identical range of rotation, such that a common FOV can be defined among the micro-mirrors of a micro-mirror array. Moreover, the object detection/scanning operations at multiple directions by the multiple micro-mirror arrays can be synchronized to facilitate correlations among the object detection/scanning operations results in the multiple FOVs.

However, due to precision limitations in the fabrication process, component variations may exist among the micro-mirror assemblies, which can lead to natural frequency variations among the micro-mirror assemblies. For example, the micro-mirrors can have different weights, the connection structures may have different elasticity, etc., all of which can introduce variations in the natural frequency among the micro-mirror assemblies. As a result, in response to a common control signal, the oscillatory rotations of the micro-mirrors can experience different phase lags such that at least some of the micro-mirrors can rotate by different angles simultaneously, which can disperse the steered light and reduce the resolution of the object scanning/detection operation. Moreover, each micro-mirror can have different ranges of angles of rotations (represented by the amplitudes of the oscillatory rotation), and the FOV and the range of detectable objects can be reduced as a result. Moreover, as the object detection/scanning operations at multiple directions by the multiple micro-mirror arrays become less synchronous, it becomes more difficult to correlate the object detection/scanning operations results in the multiple FOVs. All these can degrade the object detection/scanning operations by the micro-mirror arrays.

Conceptual Overview of Certain Embodiments

Examples of the present disclosure relate to a light steering system that can address the problems described above. Various embodiments of the light steering can include a plurality of mirrors to perform light steering, such as those shown and described below with respect to FIG. 2A-FIG. 11. The light steering system can be used as part of a transmitter to control a direction of projection of output light. The light steering system can also be used as part of a receiver to select a direction of input light to be detected by the receiver. The light steering system can also be used in a coaxial configuration such that the light steering system can project output light to a location and can detect light reflected from that location.

Figure 5A:
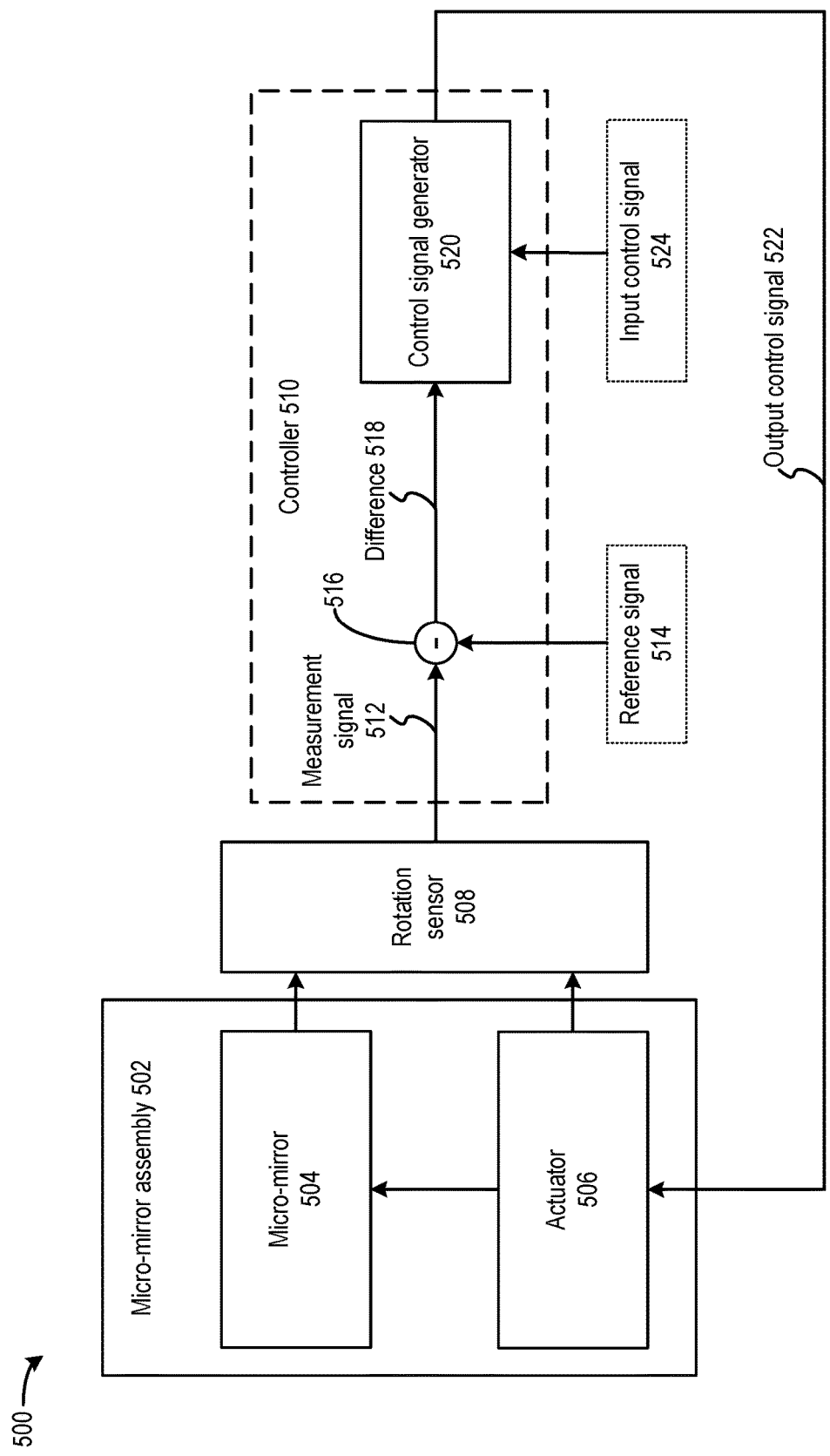
FIG. 5A-FIG. 5D illustrate examples of a light steering system, according to certain embodiments.

In some embodiments, a light steering system may include a light source and a semiconductor integrated circuit. As shown in FIG. 5A, the semiconductor integrated circuit may include a microelectromechanical system (MEMS), a rotation sensor, and a controller. The MEMS may include an array of micro-mirror assemblies, each micro-mirror assembly (e.g., micro-mirror assembly 502) comprising a rotatable micro-mirror (e.g., micro-mirror 504) and an actuator (e.g., actuator 506). The actuator can cause the micro-mirror to perform an oscillatory rotation, in which the micro-mirror rotates back and forward in an oscillatory pattern. The micro-mirror assemblies of the MEMS may be configured to reflect light from the light source along an output projection path. The micro-mirror assemblies of the MEMS may also be configured to reflect incident light propagating along an input path to the receiver. The actuator of each micro-mirror assembly is controllable by the controller to rotate the micro-mirror.

As shown in FIG. 5A, the semiconductor integrated circuit further includes a rotation sensor (e.g., rotation sensor 508) to generate measurement signals (e.g., measurement signal 512) of the oscillatory rotation of the micro-mirrors. The controller can implement a feedback loop to regulate various aspects of the oscillatory rotation, such as a phase and a range of the oscillatory rotation, of the first micro-mirror based on the measurements from the rotation sensor.

Figure 6A:
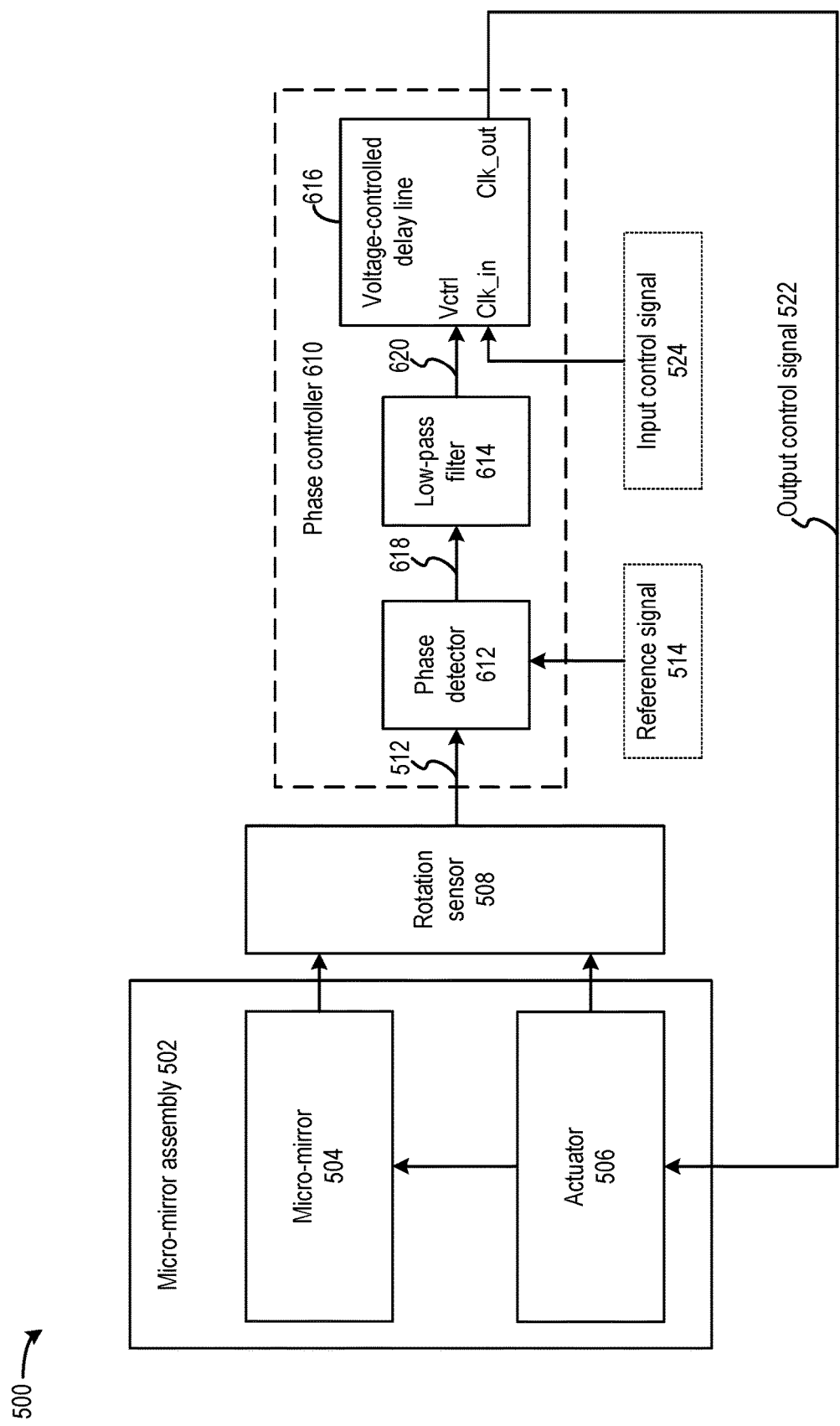
FIG. 6A-FIG. 6B illustrate examples of a phase control system that can be part of the light steering system of FIG. 5A-FIG. 5C, according to certain embodiments.

Various techniques are proposed to regulate the phase of rotation of a micro-mirror. As shown in FIG. 6A, in some embodiments, controller 510 may include a phase controller 610 which may include a phase detector 612, a low-pass filter 614, and a voltage-controlled delay line (VCDL) 616. Examples of phase detector 612, a low-pass filter 614, and a voltage-controlled delay line (VCDL) 616 are described in FIG. 6B. Phase detector 612 and low-pass filter 614 can be part of difference generator 516 of FIG. 5A. Phase detector 612 can receive, from rotation sensor 508, measurements of the oscillatory rotation of a micro-mirror. Phase detector 612 can also receive reference signal 514 having a pre-determined target phase. Phase detector 612 can generate a phase difference 618 between measurement signal 512 and reference signal 514, whereas low-pass filter 614 can generate a control voltage (VCTRL) 620 based on filtering phase difference 618. VCTRL 620 can set a delay introduced by VCDL 616 between input control signal 524 and output control signal 522. With such arrangements, the delay of VCDL 616 can be increased or reduced based on phase difference 618 to control the oscillatory rotations of multiple micro-mirrors 304 to have the same phase (or at least having a fixed phase relationship) with reference signal 514, so that their rotations can be synchronized.

Figure 7A:
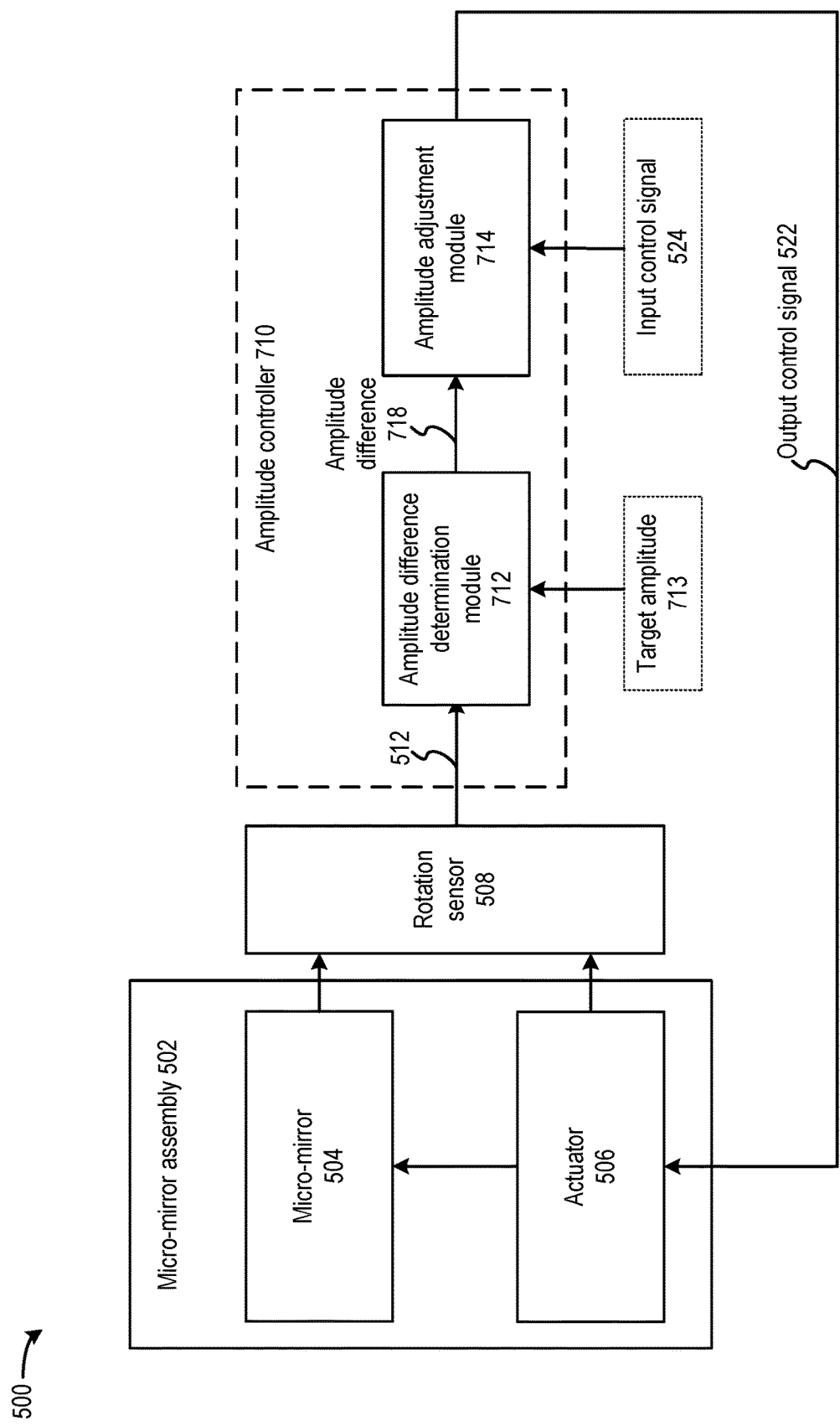
FIG. 7A-FIG. 7C illustrate examples of an amplitude control system that can be part of the light steering system of FIG. 5A-FIG. 5C, according to certain embodiments.

In addition, various techniques are also proposed to regulate the amplitude/range of rotation of a micro-mirror. As shown in FIG. 7A, in some embodiments, controller 510 may include an amplitude controller 710 which may include an amplitude difference determination module 712 and an amplitude adjustment module 714. Amplitude difference determination module 712 can determine an amplitude/range of rotation of micro-mirror 504 based on measurement signal 514. Amplitude difference determination module 712 can also receive information of a target amplitude/range 713 of rotation of micro-mirror 504 from reference signal 514. Amplitude difference determination module 712 can determine an amplitude difference 718 by comparing the amplitude of the oscillatory rotation micro-mirror 504 and the target amplitude. Amplitude adjustment module 714 can generate output control signal 522 from input control signal 524 based on amplitude difference 718, and transmit output control signal 522 to actuator 506 to control the amplitude of the oscillatory rotation of micro-mirror 504. As to be described in FIG. 7B-FIG. 7D, amplitude adjustment module 714 can generate output control signal 522 based on adjusting the amplitude and/or the duty cycle of output control signal 522. With such arrangements, the oscillatory rotations of multiple micro-mirrors 504 have the same amplitude/range with reference signal 514, so that their rotations can be synchronized.

Figure 8A:
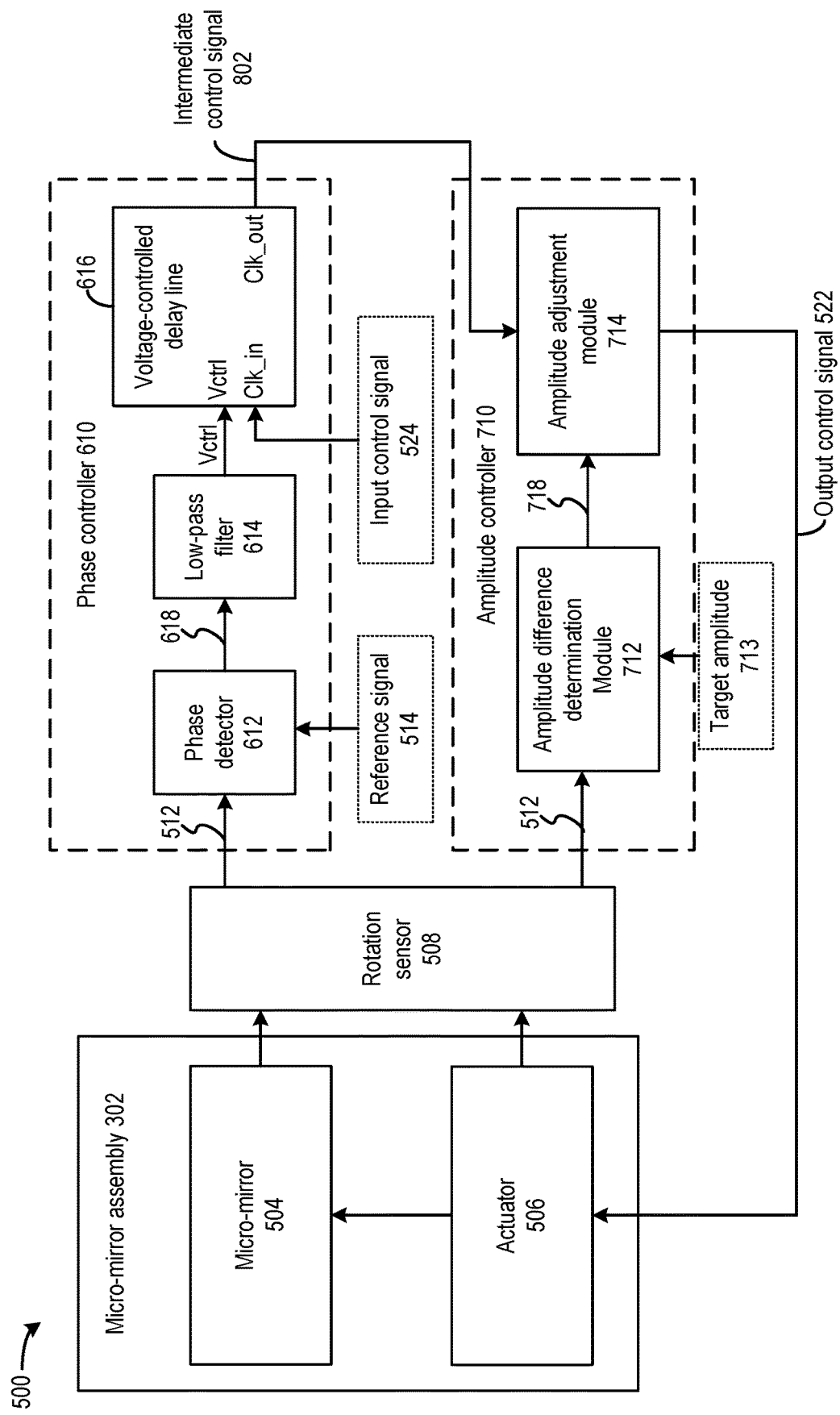
FIG. 8A-FIG. 8B illustrate examples of a light steering system that performs both phase control and amplitude control, according to certain embodiments.
Figure 8B:
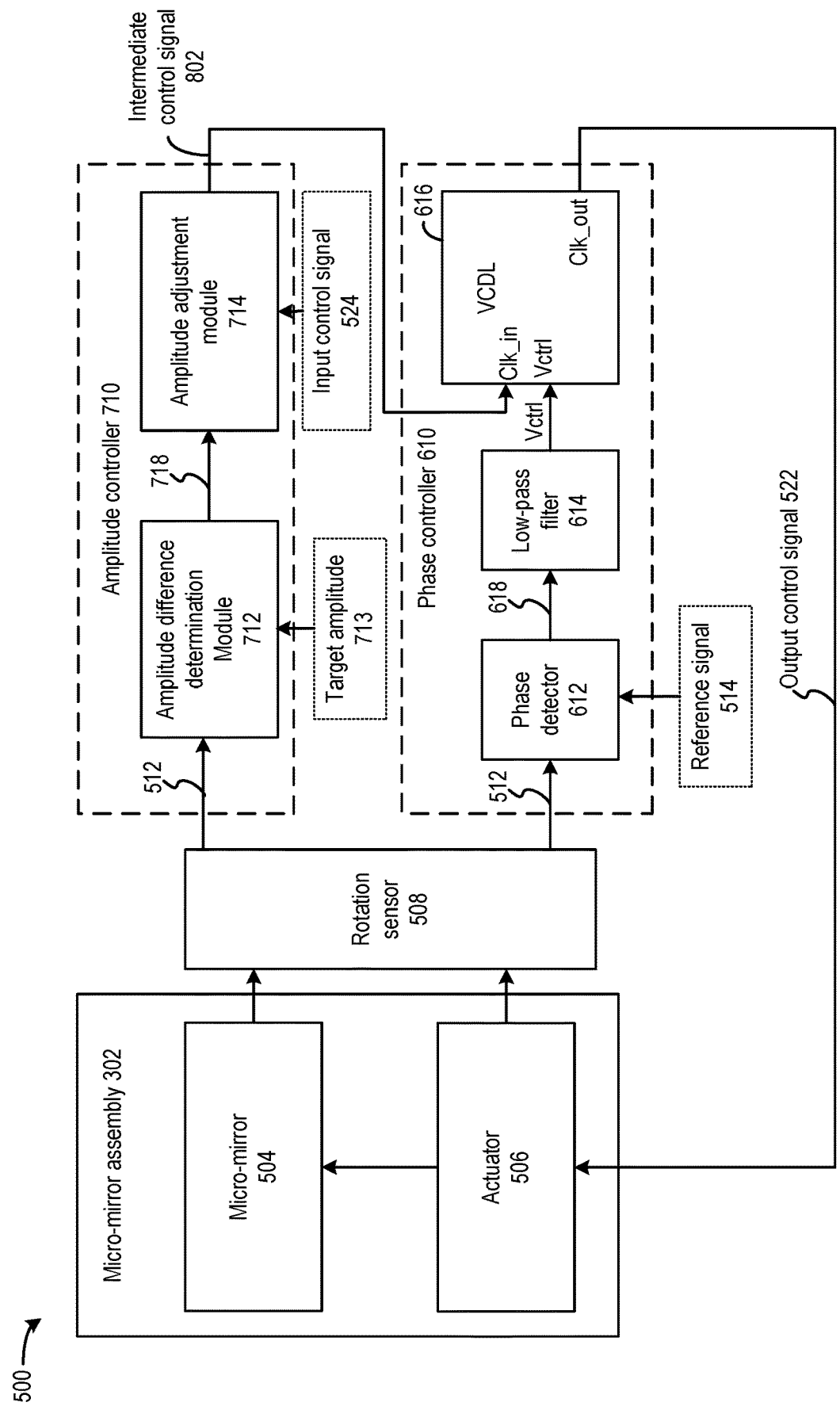

In some embodiments, as shown in FIG. 8A and FIG. 8B, controller 510 may include both phase controller 610 and amplitude controller 710 to regulate both the phase and the amplitude of the oscillatory rotation of micro-mirror 504. Phase controller 610 and amplitude controller 710 can adjust input control signal 524 sequentially. In some embodiments, as shown in FIG. 8A, phase controller 610 can adjust the phase of input control signal 524 based on phase difference 618 to generate an intermediate control signal 802, and transmit intermediate control signal 802 to amplitude controller 710. Amplitude controller 710 can then adjust at least one of the amplitude or duty cycles of intermediate control signal 802 based on amplitude difference 718 to generate output control signal 522. In some embodiments, as shown in FIG. 8B, amplitude controller 710 can adjust at least one of the amplitude or duty cycles of input control signal 524, followed by phase adjustment by phase controller 610 to generate output control signal 522. In both FIG. 8A and FIG. 8B, to improve loop stability and to facilitate convergence, one of the feedback loops (e.g., amplitude feedback loop in FIG. 8A, phase feedback loop in FIG. 8B) can be disabled initially and can be enabled when the output control signal/intermediate control signal from the other feedback loop settles to within a certain range.

Figure 9A:
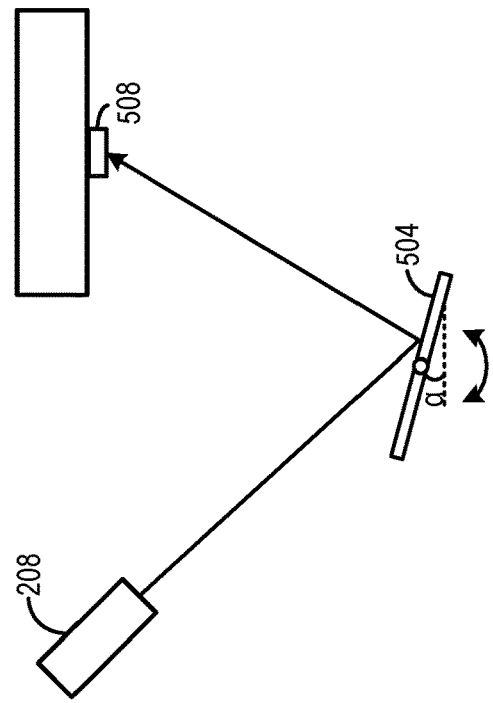
FIG. 9A-FIG. 9C illustrate examples of rotation sensor that can be part of the light steering system of FIG. 5A-FIG. 8B, according to certain embodiments.
Figure 9A:
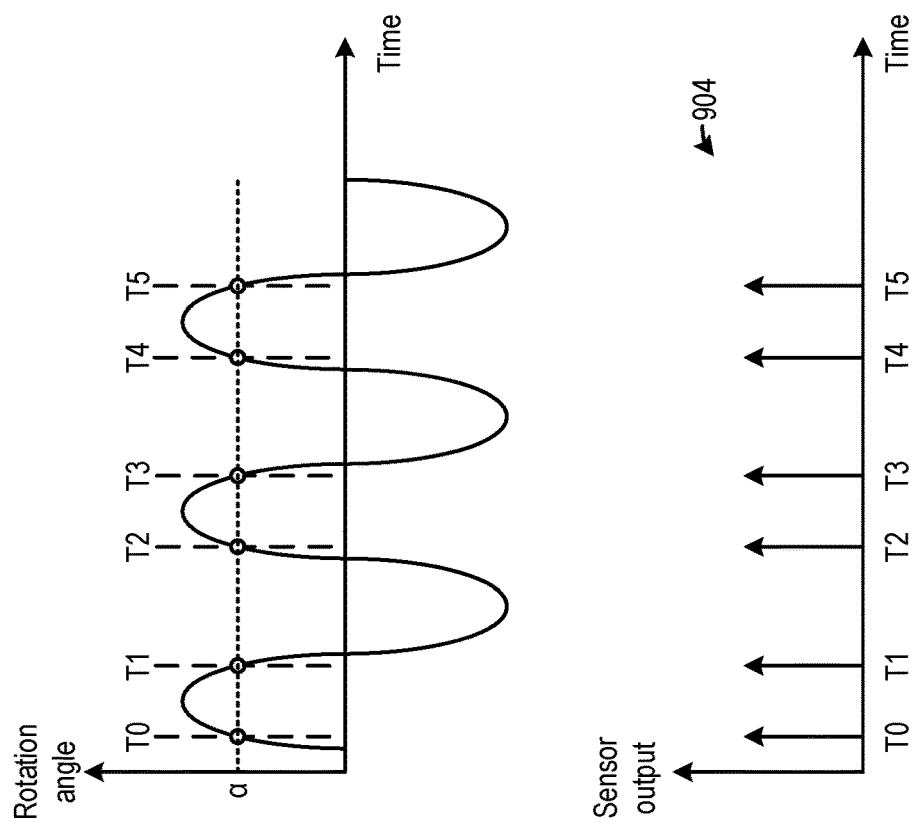
Figure 9B:
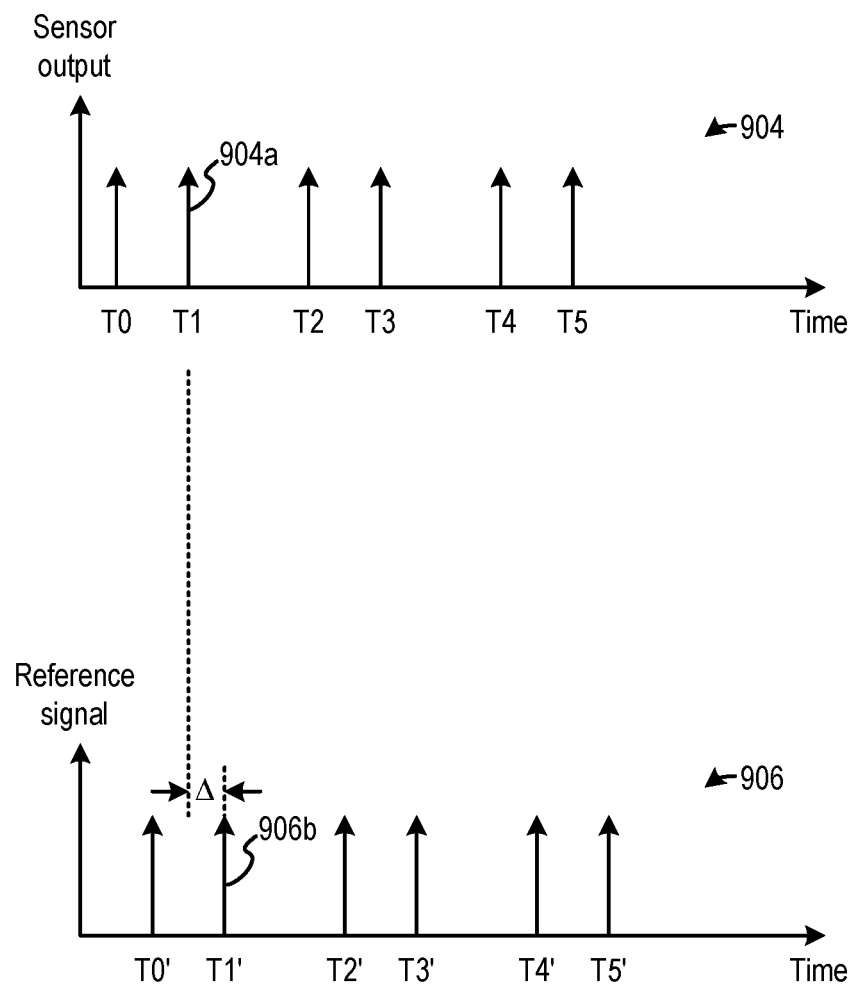
Figure 9C:
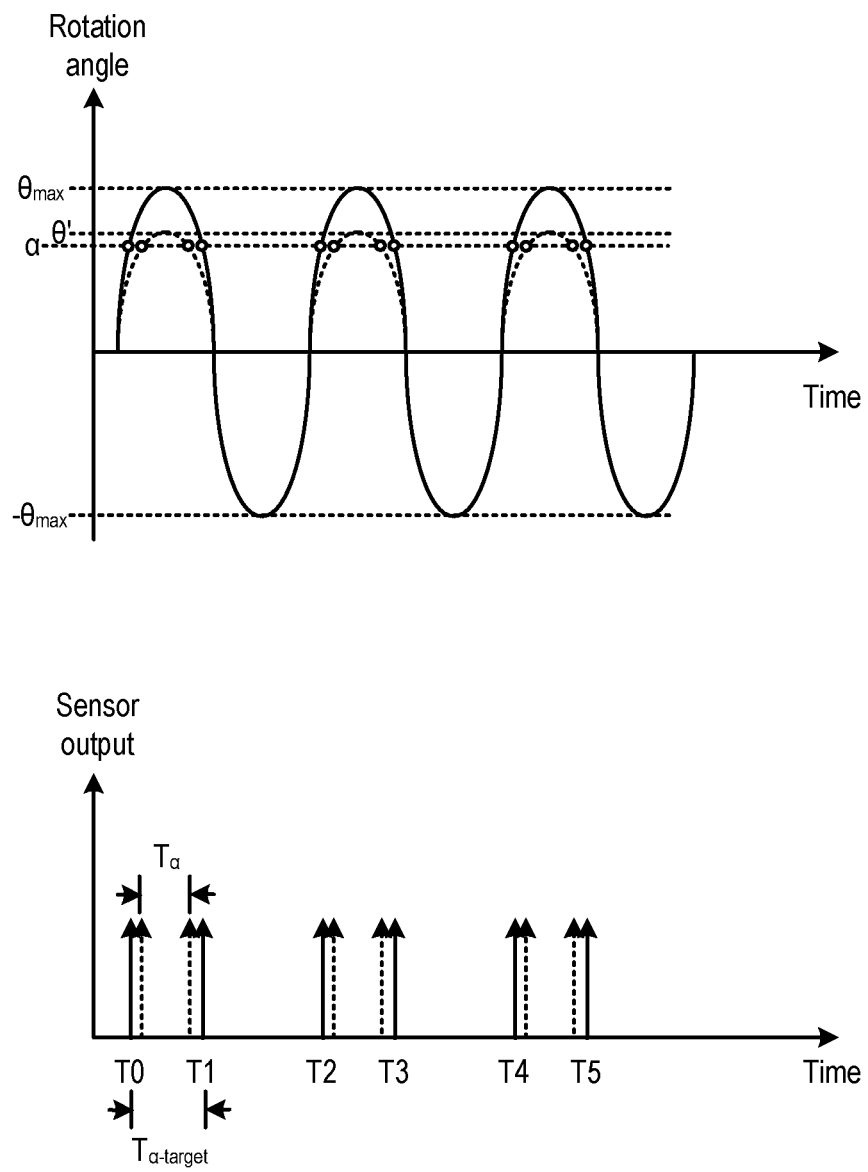

Rotation sensor 508 can employ various techniques to measure the angle of rotation of a micro-mirror, such as optical sensing as shown in FIG. 9A and FIG. 9B to track the times when the micro-mirror rotates at a certain angle. In some embodiments, the actuator may include movable electrostatic devices such as comb drives, and rotation sensor 508 can include circuits to measure the capacitance of the movable electrostatic devices to measure the angle of rotation of the micro-mirror, as shown in FIG. 9C and FIG. 9D.

With the disclosed embodiments, the phase and amplitude of the oscillatory rotation of micro-mirrors can be controlled and regulated, which allow the micro-mirrors to rotate synchronously. The synchronous rotation of micro-mirrors within a micro-mirror array can achieve the same reflective area of a single mirror but with smaller torque, and the FOV can be improved. Moreover, by synchronizing the oscillatory rotation of micro-mirrors for different FOVs, the object detection/scanning operations results in the multiple FOVs can be correlated more easily. All of these can improve the robustness and performance of the light steering system over conventional implementations.

Typical System Environment for Certain Embodiments

FIG. 1 illustrates an autonomous vehicle 100 in which the disclosed techniques can be implemented. Autonomous vehicle 100 includes a LiDAR module 102. LiDAR module 102 allows autonomous vehicle 100 to perform object detection and ranging in a surrounding environment. Based on the result of object detection and ranging, autonomous vehicle 100 can maneuver to avoid a collision with the object. LiDAR module 102 can include a light steering transmitter 104 and a receiver 106. Light steering transmitter 104 can project one or more light signals 108 at various directions at different times in any suitable scanning pattern, while receiver 106 can monitor for a light signal 110 which is generated by the reflection of light signal 108 by an object. Light signals 108 and 110 may include, for example, a light pulse, a frequency modulated continuous wave (FMCW) signal, an amplitude modulated continuous wave (AMCW) signal, etc. LiDAR module 102 can detect the object based on the reception of light pulse 110, and can perform a ranging determination (e.g., a distance of the object) based on a time difference between light signals 108 and 110. For example, as shown in FIG. 1, LiDAR module 102 can transmit light signal 108 at a direction directly in front of autonomous vehicle 100 at time T1 and receive light signal 110 reflected by an object 112 (e.g., another vehicle) at time T2. Based on the reception of light signal 110, LiDAR module 102 can determine that object 112 is directly in front of autonomous vehicle 100. Moreover, based on the time difference between T1 and T2, LiDAR module 102 can also determine a distance 114 between autonomous vehicle 100 and object 112. Autonomous vehicle 100 can adjust its speed (e.g., slowing or stopping) to avoid collision with object 112 based on the detection and ranging of object 112 by LiDAR module 102.

FIGS. 2A-2E illustrate examples of internal components of a LiDAR module 102. LiDAR module 102 includes a transmitter 202, a receiver 204, a LiDAR controller 206 which controls the operations of transmitter 202 and receiver 204. Transmitter 202 includes a light source 208 and a collimator lens 210, whereas receiver 204 includes a lens 214 and a photodetector 216. LiDAR module 102 further includes a mirror assembly 212 and a beam splitter 213. In LiDAR module 102, transmitter 202 and receiver 204 can be configured as a coaxial system to share mirror assembly 212 to perform light steering operation, with beam splitter 213 configured to reflect incident light reflected by mirror assembly 212 to receiver 204.

Figure 2A:
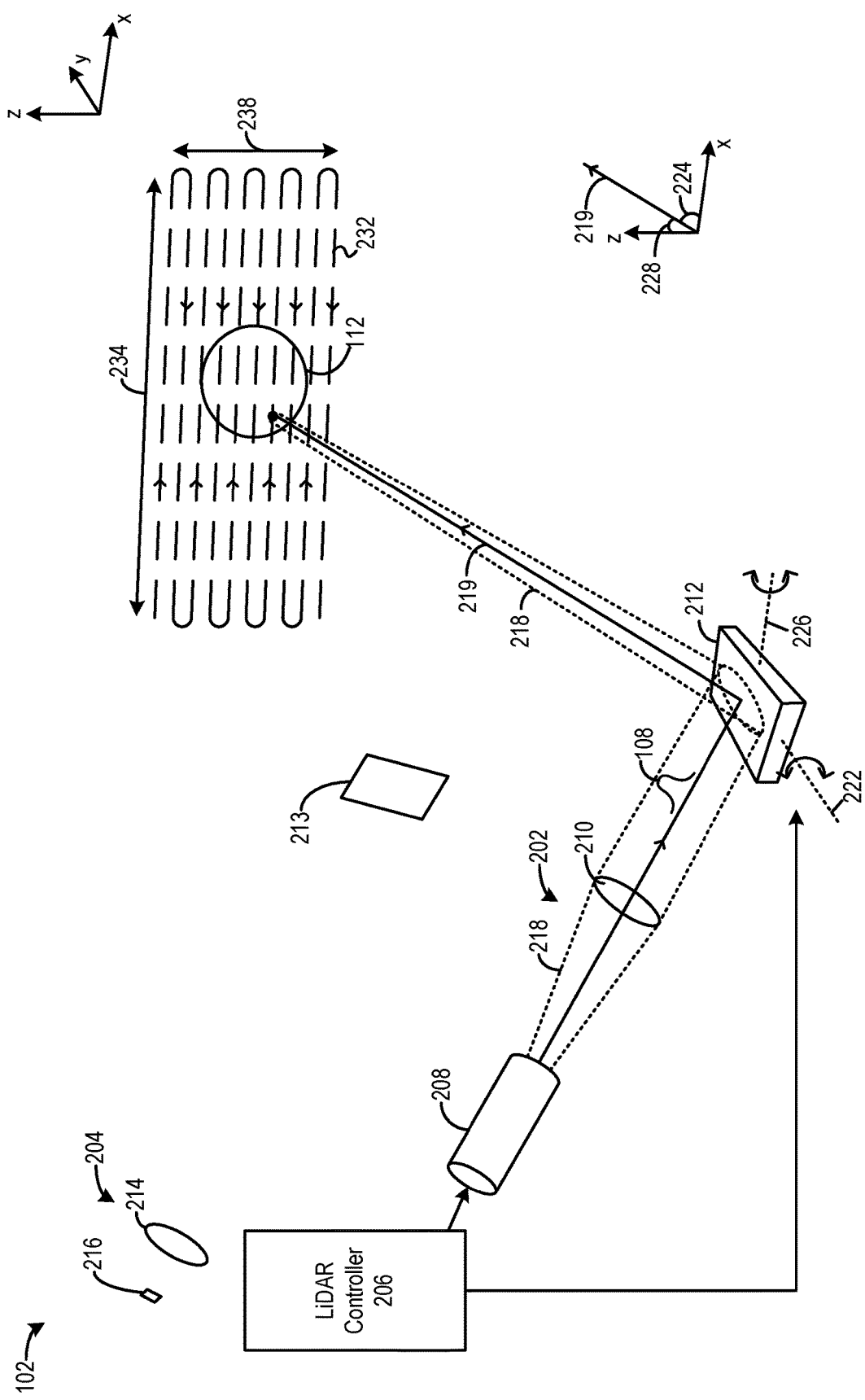
FIG. 2A-FIG. 2E illustrate examples of a light steering system, according to certain embodiments.

FIG. 2A illustrates a light projection operation. To project light, LiDAR controller 206 can control light source 208 (e.g., a pulsed laser diode, a source of FMCW signal, AMCW signal, etc.) to transmit light signal 108 as part of light beam 218. Light beam 218 can disperse upon leaving light source 208 and can be converted into collimated light beam 218 by collimator lens 210. Collimated light beam 218 can be incident upon a mirror assembly 212, which can reflect collimated light 218 to steer it along an output projection path 219 towards object 112. Mirror assembly 212 can include one or more rotatable mirrors. FIG. 2A illustrates mirror assembly 212 as having one mirror, but as to be described below, a micro-mirror array comprising multiple micro-mirror assemblies can be used to provide the steering capability of mirror assembly 212. Mirror assembly 212 further includes one or more actuators (not shown in FIG. 2A) to rotate the rotatable mirrors. The actuators can rotate the rotatable mirrors around a first axis 222, and can rotate the rotatable mirrors along a second axis 226. The oscillatory rotation around first axis 222 can change a first angle 224 of output projection path 219 with respect to a first dimension (e.g., the x-axis), whereas the oscillatory rotation around second axis 226 can change a second angle 228 of output projection path 219 with respect to a second dimension (e.g., the z-axis). LiDAR controller 206 can control the actuators to produce different combinations of angles of rotation around first axis 222 and second axis 226 such that the movement of output projection path 219 can follow a scanning pattern 232. A range 234 of movement of output projection path 219 along the x-axis, as well as a range 238 of movement of output projection path 219 along the z-axis, can define an FOV. An object within the FOV, such as object 112, can receive and reflect collimated light beam 218 to form a reflected light signal, which can be received by receiver 204.

Figure 2B:
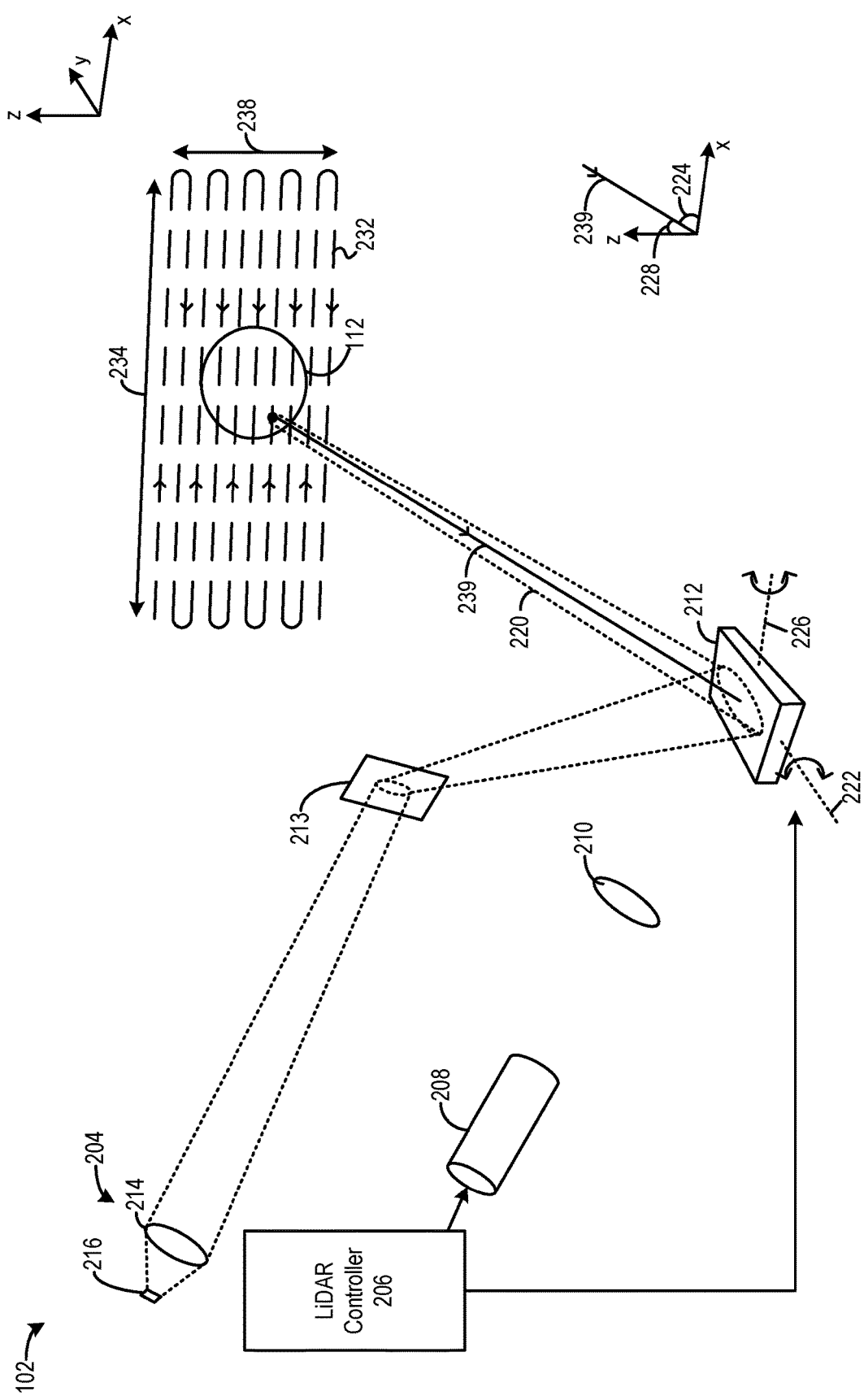

FIG. 2B illustrates a light detection operation. LiDAR controller 206 can select an incident light direction 239 for detection of incident light by receiver 204. The selection can be based on setting the angles of rotation of the rotatable mirrors of mirror assembly 212, such that only light beam 220 propagating along light direction 239 gets reflected to beam splitter 213, which can then divert light beam 220 to photodetector 216 via collimator lens 214. With such arrangements, receiver 204 can selectively receive signals that are relevant for the ranging/imaging of object 112, such as light signal 110 generated by the reflection of collimated light beam 218 by object 112, and not receive other signals. As a result, the effect of environment disturbance on the ranging/imaging of the object can be reduced, and the system performance can be improved.

Figure 2C:
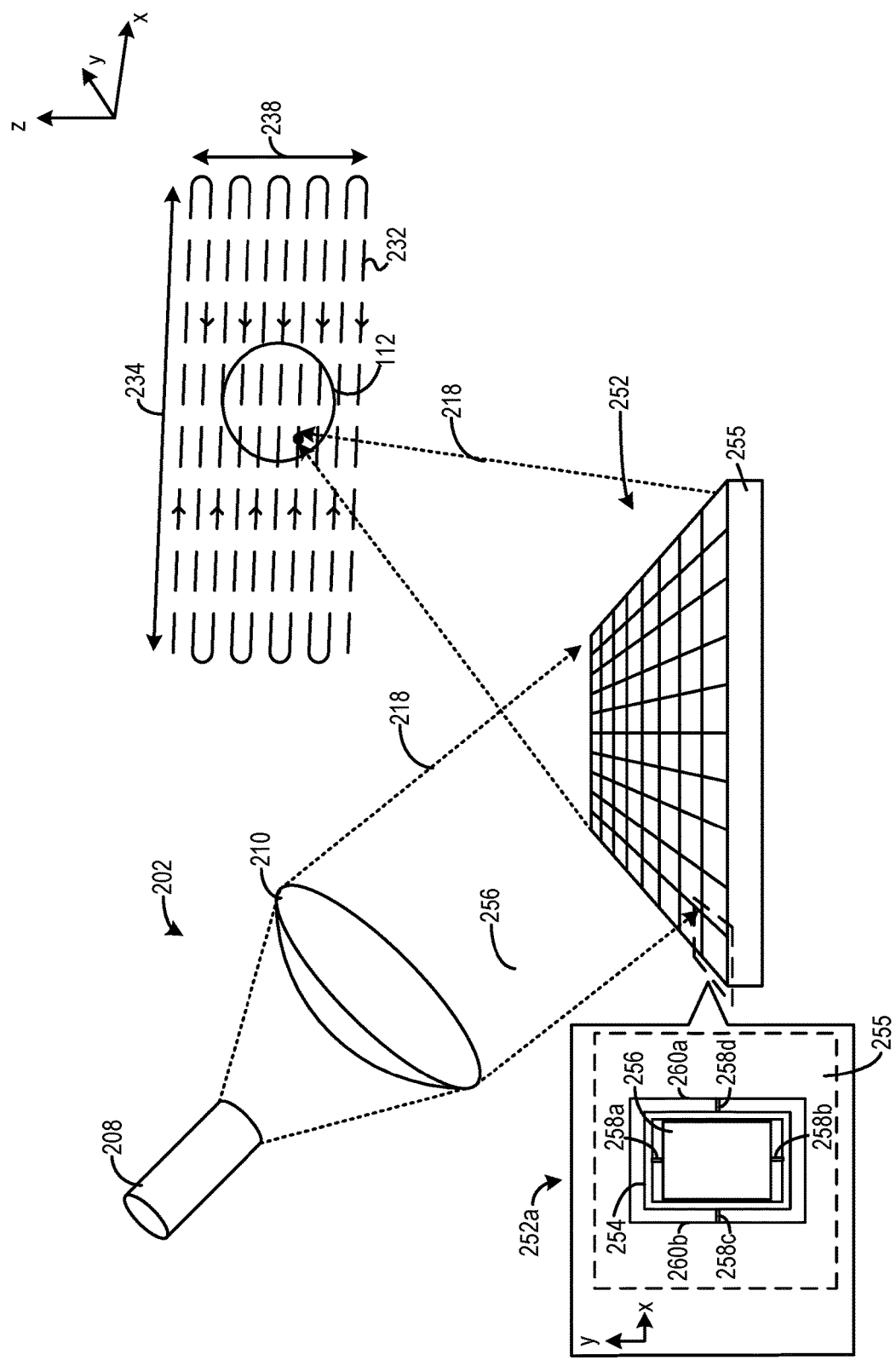

FIG. 2C illustrates an example of a micro-mirror array 250 that can be part of light steering transmitter 202 and can provide the steering capability of mirror assembly 212. Micro-mirror array 250 can include an array of micro-mirror assemblies 252, including micro-mirror assembly 252a. The array of micro-mirror assemblies 252 can include a micro-electromechanical system (MEMS) implemented on a semiconductor substrate 255. Each of micro-mirror assemblies 252 may include a frame 254 and a micro-mirror 256 forming a gimbal structure. Specifically, connection structures 258a and 258b connect micro-mirror 256 to frame 254, whereas connection structures 258c and 258d connect frame 254 (and micro-mirror 256) to side walls 260a and 260b semiconductor substrate 255. A pair of connection structures can define a pivot/axis of rotation for micro-mirror 256. For example, connection structures 258a and 258b can define a pivot/axis of rotation of micro-mirror 256 about the y-axis within frame 254, whereas connection structures 258c and 258d can define a pivot/axis of rotation of frame 254 and micro-mirror 256 about the x-axis with respect to semiconductor substrate 255.

In both FIG. 2B and FIG. 2C, each of micro-mirror assemblies 252 can receive and reflect part of light beam 218. The micro-mirror 256 of each of micro-mirror assemblies 252 can be rotated by an actuator of the micro-mirror assembly (not shown in FIG. 2B) at a first angle about the y-axis (around connection structures 258a and 258b) and at a second angle about the x-axis (around connection structures 258c and 258d) to set the direction of output projection path for light beam 218 and to define the FOV, as in FIG. 2A, or to select the direction of input light to be detected by receiver 204, as in FIG. 2B. The array of micro-mirror assemblies 252 can provide the same reflective area as a single mirror if micro-mirror 256 of each of micro-mirror assemblies 252 rotates synchronously, such that all micro-mirrors rotate at the same angle about the y-axis and/or about the x-axis. If the oscillatory rotations of the micro-mirrors are not synchronized, the steered light may be dispersed by the micro-mirrors having different angles of rotation, which can reduce the resolution of the object detection/scanning operation. Moreover, if the amplitudes/ranges of rotation of the micro-mirrors are not well controlled, such that some or all of the micro-mirrors have a smaller range of rotation than expected, the achievable FOV and range of object detection/scanning operations by the array of micro-mirror assemblies 252 may be reduced as well.

Figure 2D:
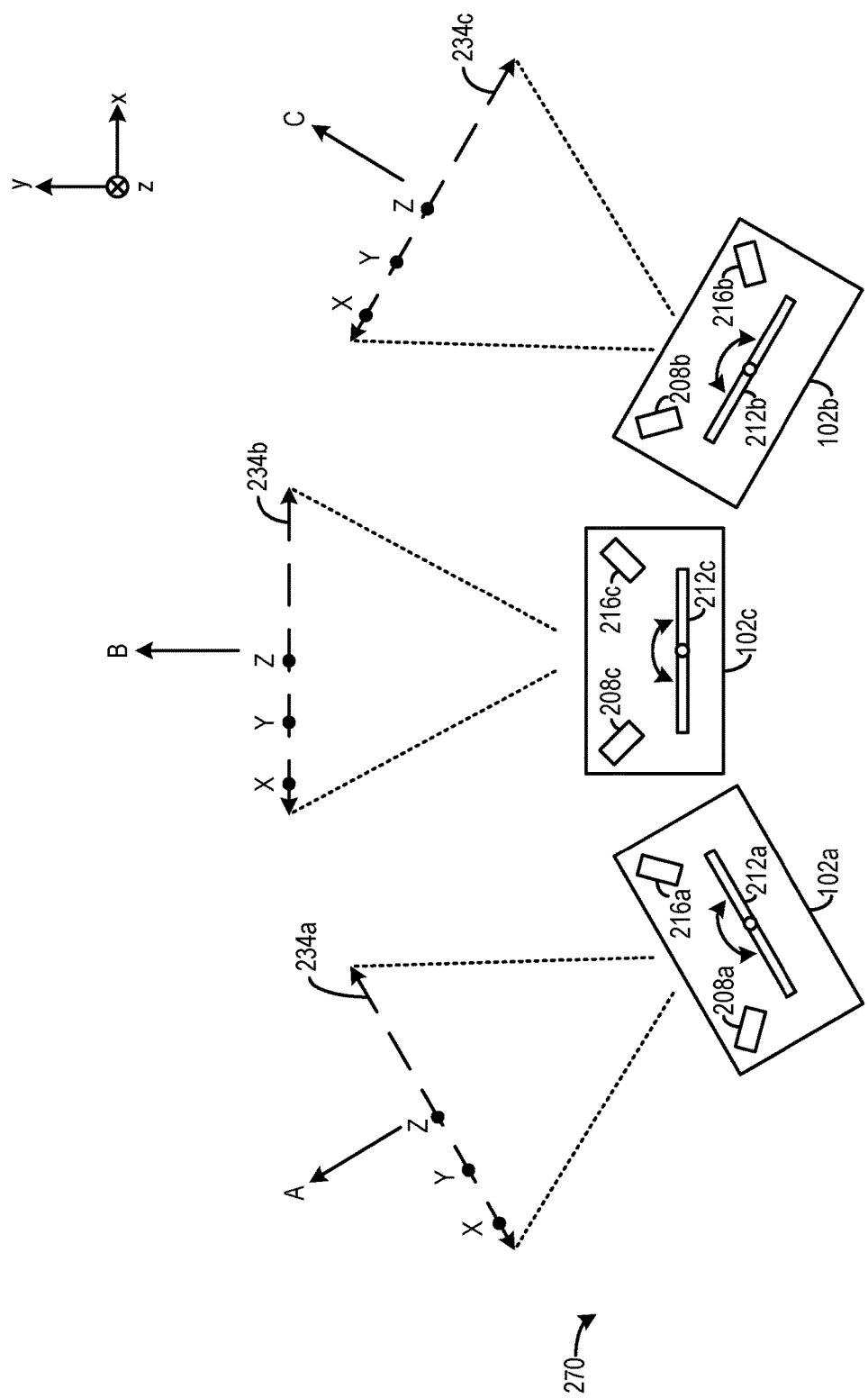
Figure 2E:
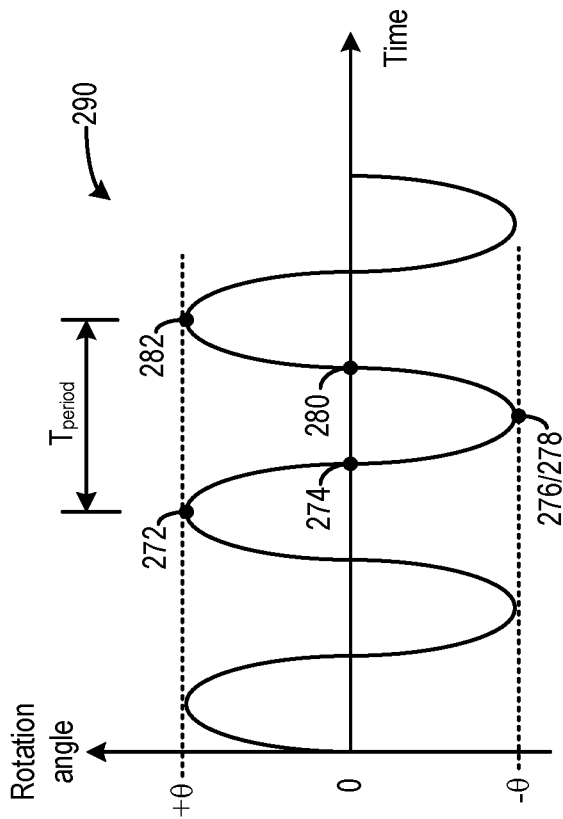
Figure 2E:
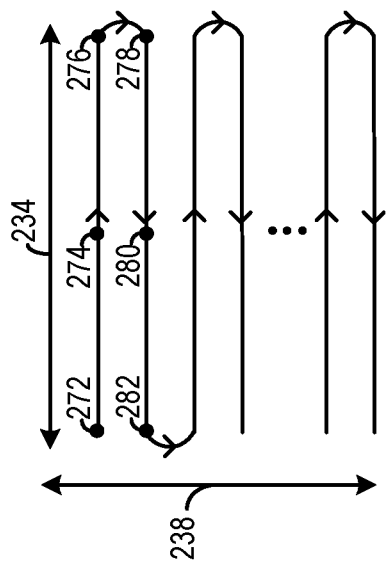

FIG. 2D illustrates another example of a LiDAR system 270, which includes a plurality of LiDAR modules 102a, 102b, and 102c facing towards different directions marked by, respectively, "A," "B," and "C." LiDAR module 102a includes light source 208a, rotatable mirror 212a, and receiver 216a. LiDAR module 102b includes light source 208b, rotatable mirror 212b, and receiver 216b. LiDAR module 102c includes light source 208c, rotatable mirror 212c, and receiver 216c. The rotatable mirror in each LiDAR module can rotate to steer light emitted by the light source outward for object scanning/detection, and to steer light reflected by the object to the receiver. The oscillatory rotation of the mirrors of LiDAR modules 102a, 102b, and 102c can define, respectively, ranges 234a, 234b, and 234c of movement of output projection path of light (or input path of light). Each of ranges 234a, 234b, and 234c can define an FOV at, respectively, directions A, B, and C. The FOVs can combine to provide an expanded aggregate FOV of LiDAR system 270.

In LiDAR system 270, mirrors 212a, 212b, and 212c can also be controlled to rotate synchronously. The synchronous rotations of the mirrors allow the object detection/scanning operation to be synchronized across different FOVs. For example, if mirrors 212a, 212b, and 212c are controlled to rotate by the same angle simultaneously, LIDAR system 270 can perform object detection/scanning operation at position X at time T0, followed by position Y at time T1, and position Z at time T2 in each of ranges 234a, 234b, and 234c. The synchronous object detection/scanning operations can facilitate the correlation of the objection detection results among the different FOVs, which allows the FOVs to be combined to form the larger aggregate FOV of LiDAR system 270. But if the mirrors do not rotate synchronously and have unpredictable phase relationships, the correlation of the objection detection results among the different FOVs needs to account for the oscillatory rotation angle differences among the mirrors, which can complicate the correlation operations. Moreover, if mirrors 212a, 212b, and 212c have different amplitudes/ranges of rotation, the achievable FOVs can become non-uniform, which can reduce the aggregate FOV of LiDAR system 270.

In the LiDAR systems 102 and 270 of FIGS. 2A-2D, a micro-mirror can rotate following an oscillatory pattern to define the FOV. For example, as shown on the left of FIG. 2E, through the oscillatory rotation of the micro-mirror around a first axis (e.g., axis 226), light can be projected from left to right along range 234 across points 272, 274, and 276, and then from right to left along range 234 across points 278, 280, and 282. As shown on the right of FIG. 2E, the micro-mirror can rotate following an oscillatory pattern 290 with respect to time between an angle range −θ and +θ. Points 272 and 282 can correspond to the mirror having a rotation angle of +θ, and points 276 and 278 can correspond to the mirror having a rotation angle of −θ, whereas points 274 and 280 can correspond to the mirror having a zero rotation angle. The micro-mirror can also rotate along a second axis (e.g., axis 222) following another oscillatory pattern (not shown in FIG. 2E) to project the light along range 238. The oscillatory pattern can have a cycle period of $T_{period}$ and a frequency of $1/T_{period}$. The micro-mirror can be controlled by a first actuator to rotate around the first axis and controlled by a second actuator to rotate around the second axis following oscillatory patterns. The first actuator and the second actuator can generate the oscillatory rotation motions in response to control signals provided by a controller, such as LiDAR controller 206.

To reduce the driving power required from the actuator, which can also improve the reliability of the actuators, the micro-mirror can be operated in a resonant mode. The micro-mirror can have a natural frequency of oscillation. The natural frequency can be a function of, for example, the weight/mass of the micro-mirror, the elasticity of the connection structure around which the micro-mirror rotates, etc. Under the resonant mode, the control signal to the actuator can oscillate at the natural frequency, which can control the actuator to rotate the micro-mirror following an oscillatory pattern at that natural frequency. The amplitude of the oscillatory rotation, which represents the range of rotation of the micro-mirror, can be at the maximum under the resonant mode.

Figure 3A:
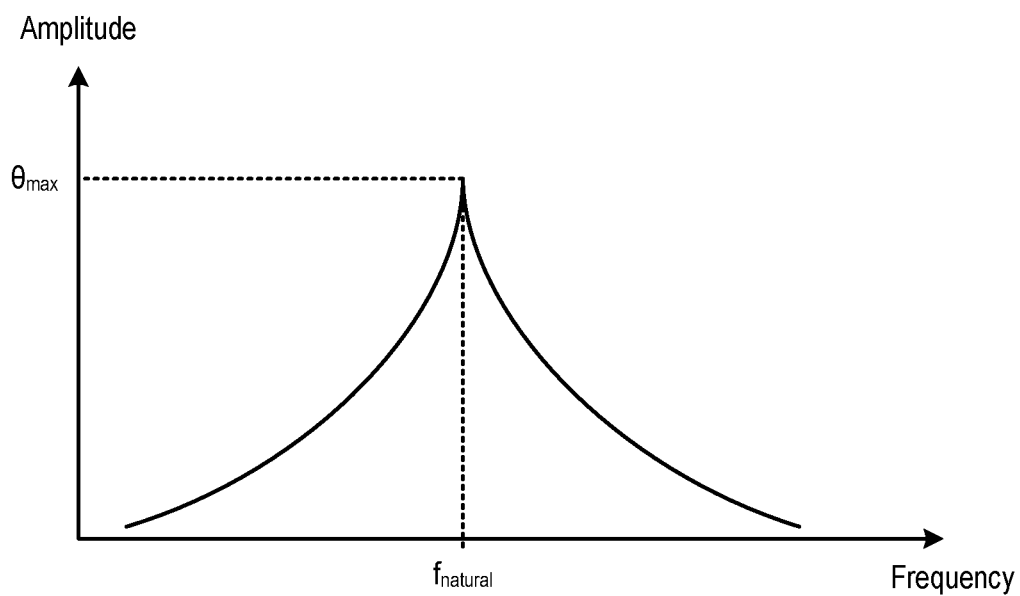
FIG. 3A-FIG. 3B illustrate various characteristics of the oscillatory rotation of a micro-mirror.
Figure 3A:
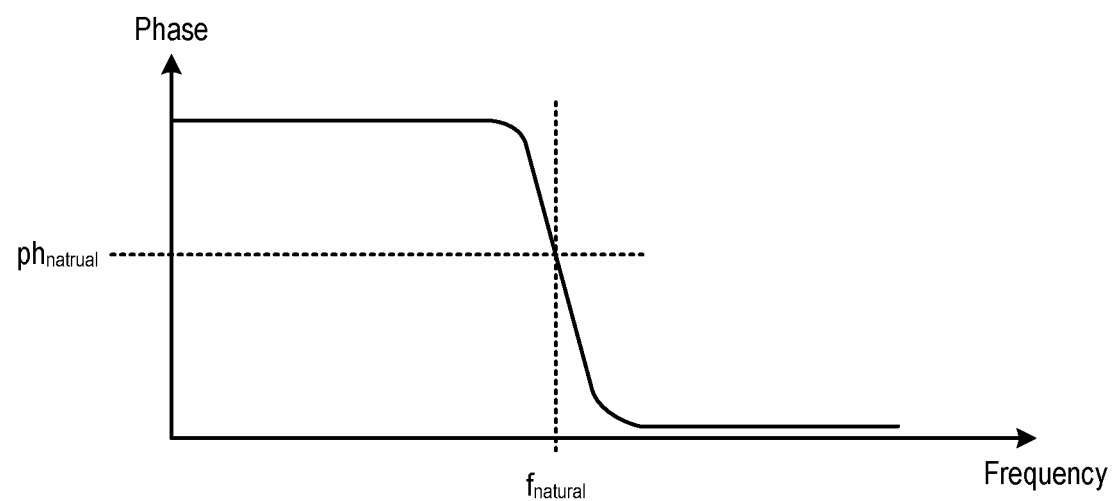
Figure 3B:
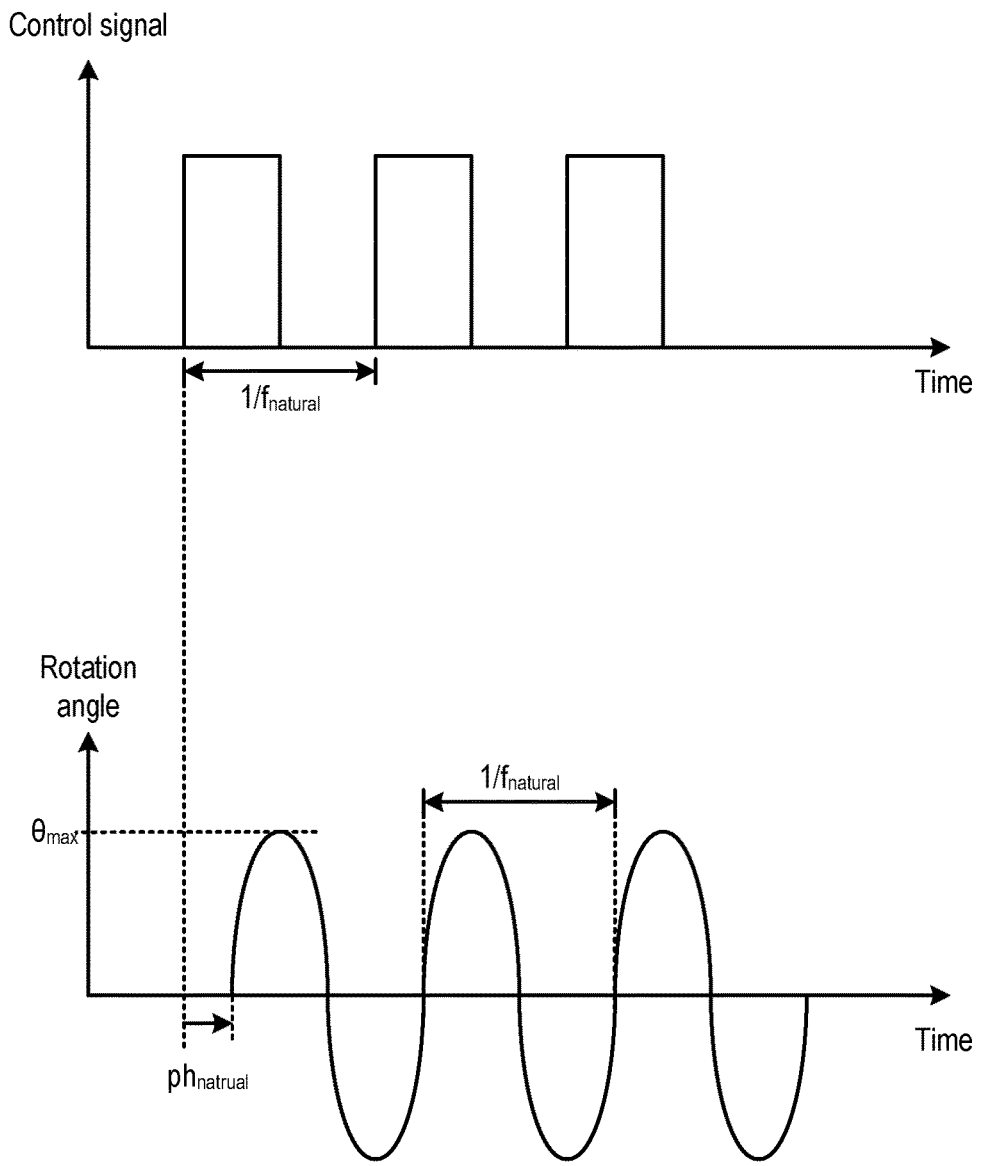

FIG. 3A and FIG. 3B illustrate various characteristics of the oscillatory rotation of a micro-mirror. FIG. 3A illustrates the characteristics of the oscillatory rotation in the frequency domain, whereas FIG. 3B illustrates the characteristics of the oscillatory rotation in the time domain. The top graph of FIG. 3A illustrates a relationship between the amplitude and frequency of the oscillatory rotation of the micro-mirror, whereas the bottom graph of FIG. 3A illustrates a relationship between a phase of the oscillatory rotation of the micro-mirror (e.g., with respect to the control signal) and the frequency of the oscillatory rotation. The amplitude can represent a magnitude of the maximum (or minimum) degrees of rotation of the micro-mirror (e.g., θ in FIG. 2E) and can reflect a range of rotation of the micro-mirror, whereas the frequency of rotation can represent how many times the micro-mirror rotates between the maximum and minimum degrees of rotation (e.g., $1/T_{period}$ in FIG. 2E). As shown in graph 302, the amplitude of the oscillatory rotation of the micro-mirror is at maximum ($θ_{max}$) when the micro-mirror rotates at a natural frequency $f_{natural}$ of the micro-mirror. The amplitude reduces when the micro-mirror rotates at a different frequency from $f_{natural}$. Moreover, at resonant frequency $f_{natural}$, the oscillatory rotation of the micro-mirror lags behind the control signal by a phase lag $ph_{natural}$. The corresponding time-domain characteristics of the control signal (which can be a voltage signal) and the oscillatory rotation of the micro-mirror under resonant mode, when both oscillate at the resonant frequency $f_{natural}$, are illustrated in FIG. 3B.

In some examples, the control signal can be generated by a frequency synthesizer, such as a phase lock loop (PLL), to set the frequency of the control signal at a target frequency, such as $f_{natural}$. Identical replicas of the control signal can be transmitted to the actuators of multiple micro-mirrors (of the same micro-mirror array or of different micro-mirror arrays), to control each mirror to rotate at the same frequency.

Although such arrangements can control the micro-mirrors to rotate at an uniform frequency, variation in the phases and amplitudes of rotations among the micro-mirrors may result if the micro-mirrors have different natural frequencies and are driven to rotate at a fixed frequency. Natural frequency variation can be caused by, for example, precision limitations in the fabrication process, which can introduce component variations among the micro-mirror assemblies. For example, the micro-mirrors can have different weights, the connection structures may have different elasticity, etc.

Figure 4A:
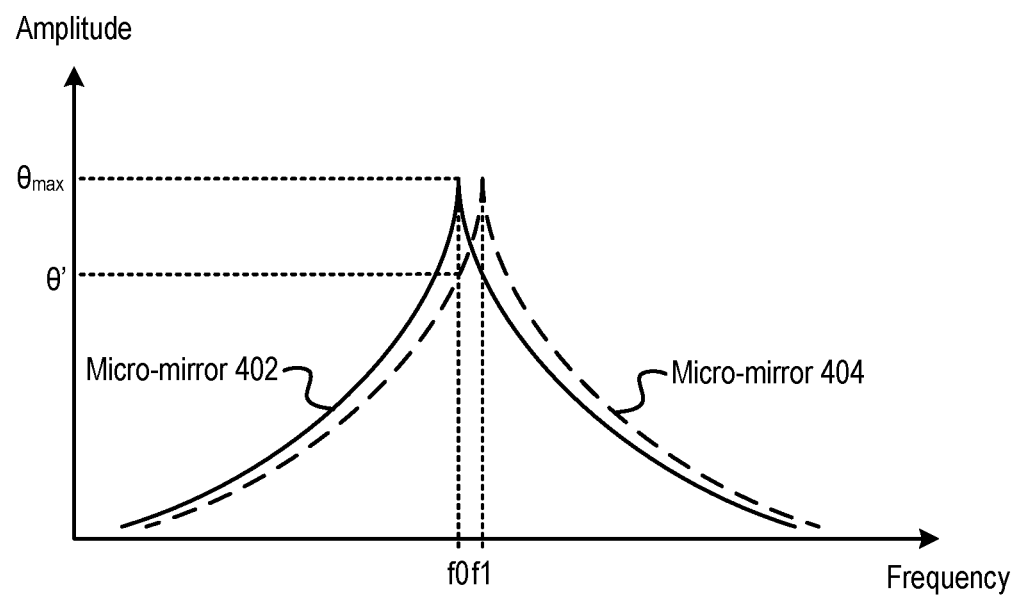
FIG. 4A-FIG. 4B illustrate examples of effects of variations in the natural frequency of the micro-mirrors.
Figure 4A:
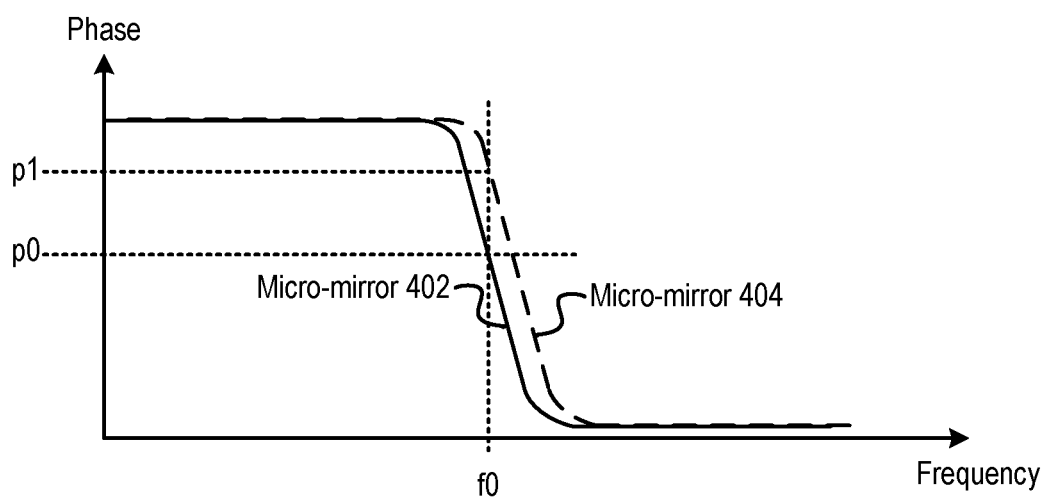
Figure 4B:
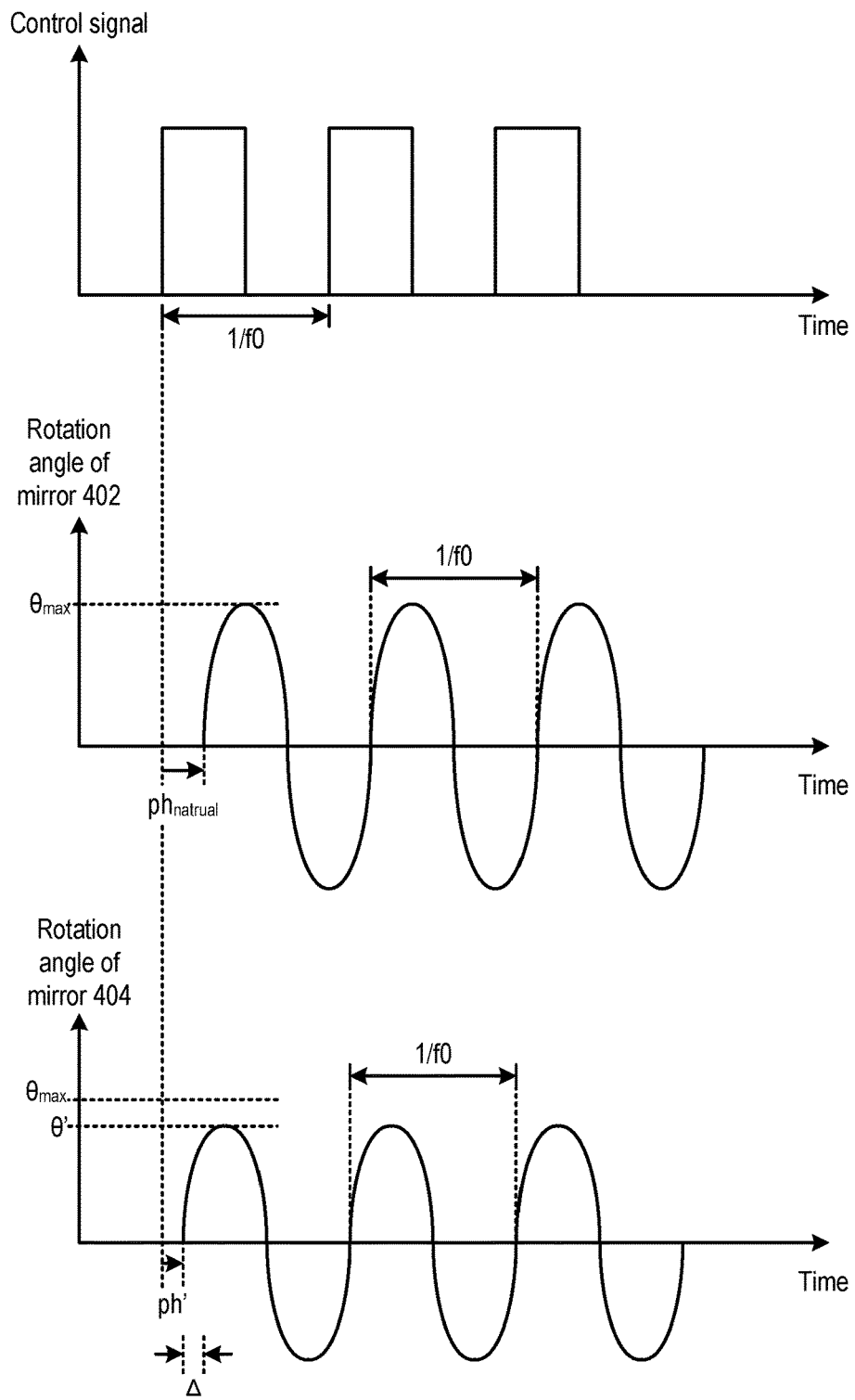

FIG. 4A and FIG. 4B illustrate the effect of variations in the natural frequency of the micro-mirrors. As shown in the top graph of FIG. 4A, micro-mirrors 402 and 404 may have different natural frequencies f0 and f1. Assuming that both micro-mirrors are driven by the same control signal which oscillates at the frequency of f0, while micro-mirror 402 can rotate with an amplitude of $\theta_{max}$, the micro-mirror 404 can only rotate with a reduced amplitude $\theta'$. Moreover, the oscillatory rotations of the two micro-mirrors also have different phase lag with respect to the control signal. As shown in the bottom graph of FIG. 4A, while micro-mirror 402 can rotate at a phase lag $ph_{natural}$ from the control signal, micro-mirror 404 rotates at a phase lag ph' from the control signal. A phase difference A between the oscillatory rotations of micro-mirror 402 and 404 may result. The corresponding time-domain characteristics of the control signal (which can be a voltage signal) and the oscillatory rotations of micro-mirrors 402 and 404 are illustrated in FIG. 4B.

As shown in FIG. 4A and FIG. 4B, in response to a common control signal, the oscillatory rotations of the micro-mirrors can experience different phase lags such that at least some of the micro-mirrors can rotate by different angles simultaneously. Moreover, each micro-mirror can have different ranges of angles of rotations (represented by the amplitudes of the oscillatory rotations). All these can degrade the object detection/scanning operations by the micro-mirror arrays. For example, the variations among the angles of rotation of the micro-mirrors can lead to dispersion of the steered light, which can reduce the resolution of the object scanning/detection operation. Moreover, due to the variations in the ranges of rotation among the micro-mirrors, the FOV, which can be defined by the range of rotation of a micro-mirror, can be reduced as a result. Moreover, as the object detection/scanning operations at multiple directions by the multiple micro-mirror arrays become less synchronous, it becomes more difficult to correlate the object detection/scanning operations results in the multiple FOVs.

Examples of Mirror Rotation Control Systems

Figure 5B:
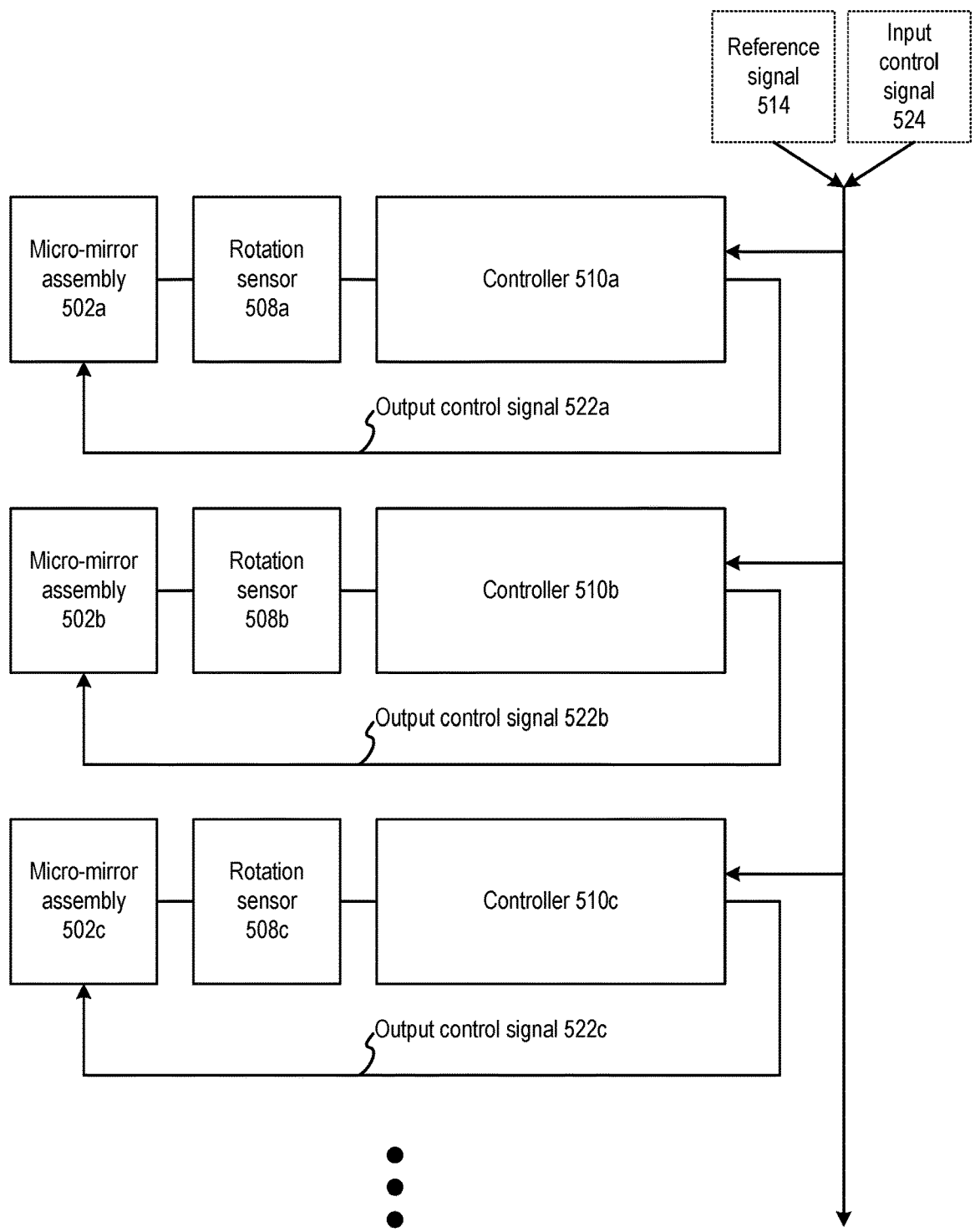
Figure 5C:
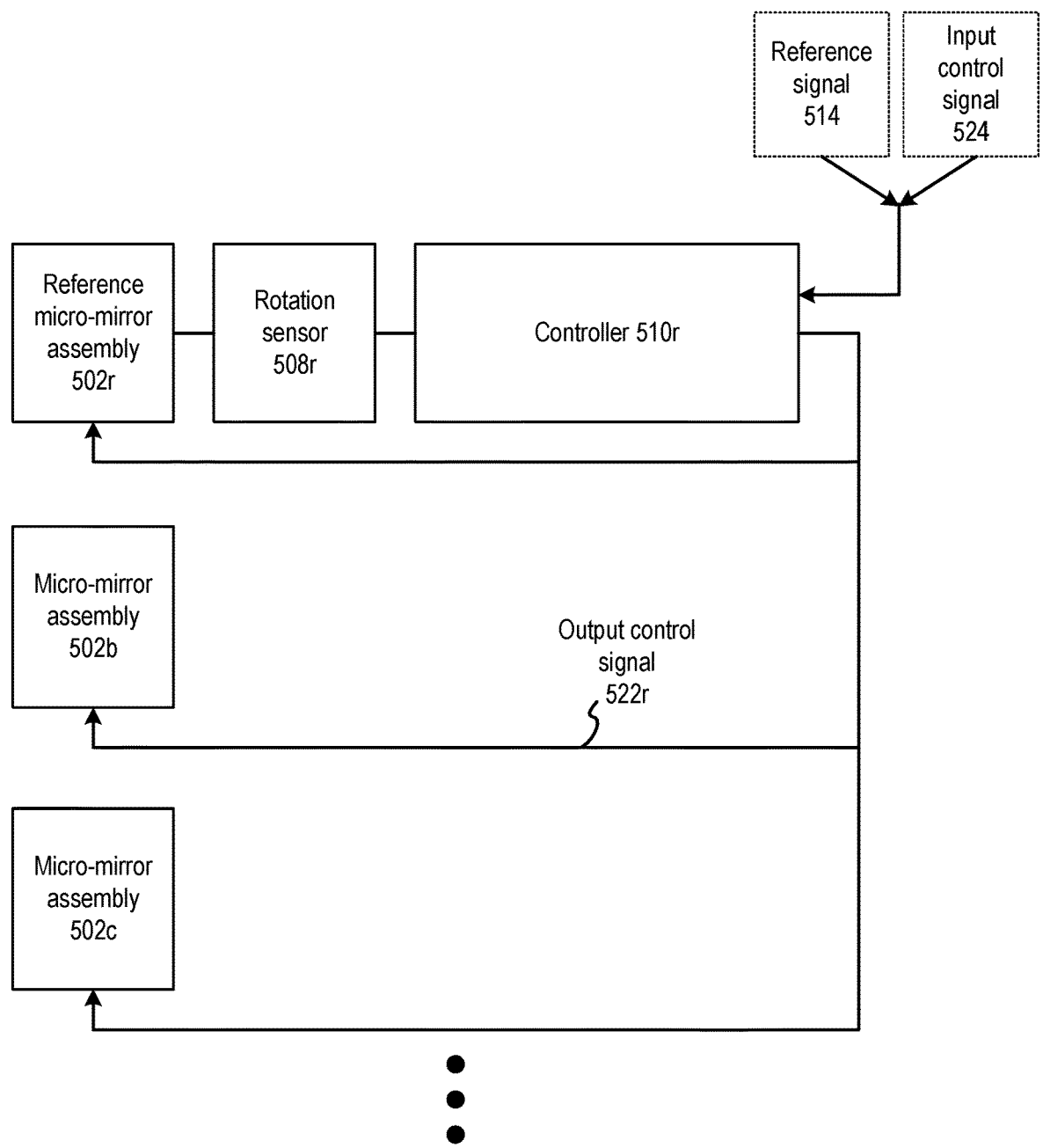

FIG. 5A-FIG. 5C illustrate examples of a light steering system that can address the problems described above. The light steering system can be part of a LiDAR module described in FIG. 2A-FIG. 2E. As shown in FIG. 5A, a light steering system 500 may include a micro-mirror assembly 502 which includes a rotatable micro-mirror 504 and an actuator 506. Light steering system 500 further includes a rotation sensor 508 and a controller 510. Light steering system 500 can be part of a microelectromechanical systems (MEMS) implemented in a semiconductor integrated circuit. Micro-mirror assembly 502 can be part of an array of micro-mirror assemblies. The micro-mirror assemblies of the MEMS may be configured to reflect light from the light source along an output projection path. The micro-mirror assemblies of the MEMS may also be configured to reflect incident light propagating along an input path to the receiver. The actuator of each micro-mirror assembly, including actuator 506, is controllable by controller 510 to rotate the micro-mirror of the micro-mirror assembly.

Rotation sensor 508 can generate a measurement signal 512 based on collecting sensor data that reflect the oscillatory rotation angle of micro-mirror 504 under the control of actuator 506. Measurement signal 512 can provide information related to the variation of the oscillatory rotation angle of micro-mirror 504 with respect to time, from which the phase and amplitude of the oscillatory rotation of the micro-mirror 504 can be determined. As to be described below, rotation sensor 508 can employ various techniques to measure the angle of rotation of micro-mirror 504, such as optical sensing as to track the times when the micro-mirror rotates at a certain angle, measuring the capacitance of actuator 506 to derive the angle of rotation of micro-mirror 504, etc.

Controller 510 can implement a feedback loop to regulate various aspects of the oscillatory rotation of the micro-mirror 504, such as the phase and/or the amplitude of the oscillatory rotation, based on measurement signal 512 from rotation sensor 508. Specifically, controller 510 can receive a reference signal 514 including information of the target rotation of micro-mirror 504. The information may specify, for example, a target phase of the oscillatory rotation of micro-mirror 504, a target range/amplitude of the oscillatory rotation of micro-mirror 504, etc. Reference signal 514 can include multiple signals, such as reference clock signals having a pre-determined phase to convey the target phase information, as well as an analog/digital signal (e.g., a voltage, a digital number, etc.) to convey the target amplitude information. Controller 510 further includes a difference generator 516 which can compare reference signal 514 with measurement signal 514 to determine a difference 518 in phase, rotation range, etc., between the target rotation and the oscillatory rotation of micro-mirror 504. Controller 510 further includes a control signal generator 520 which can generate an output control signal 522 from an input control signal 524 based on the difference. As to be described below, output control signal 522 can be generated based on, for example, adjusting a delay added to input control signal 524, adjusting the amplitude of input control signal 524, adjusting the duty cycle of input control signal 524, etc. Controller 510 can transmit output control signal 522 to actuator 506 to set at least one of the phase or the range of the oscillatory rotation of micro-mirror 504. Rotation sensor 508 can continuously measure the oscillatory rotation of micro-mirror 504 to generate the most up-to-date measurement signal 514, whereas controller 510 can continuously adjust (or maintain) output control signal 522 based on the most up-to-date measurement signal 514. A feedback loop can be formed in FIG. 5A to regulate at least one of the phase or the range of the oscillatory rotation of micro-mirror 504, such that the phase and the range of the oscillatory rotation of micro-mirror 504 can become close or identical to, respectively, the target phase and the target rotation range specified by reference signal 514.

In some embodiments, the feedback loop of FIG. 5A can be replicated for each micro-mirror assembly of an array of micro-mirror assemblies of the same integrated circuit (e.g., for the light steering system of FIG. 2C), and for different arrays of micro-mirror assemblies of different LiDAR modules (e.g., of FIG. 2D). For example, as shown in FIG. 5B, the light steering system can include multiple micro-mirror assemblies (502a, 502b, 502c, etc.) each coupled with a corresponding rotation sensor (e.g., one of rotation sensors 508a, 508b, 508c, etc.) and a corresponding controller (e.g., one of controllers 510a, 510b, 510c, etc.). Each feedback loop can receive reference signal 514, which specifies the target phase and target rotation range, and generate an output control signal (e.g., one of output control signals 522a, 522b, 522c, etc.) based on a measurement signal of the respective micro-mirror assembly, to regulate the phase and/or amplitude of the oscillatory rotation of the respective micromirror assembly. In some embodiments, each of controllers 510a, 510b, and 510c can receive the same reference signal 514 and input control signal 524 to generate respective output control signals (e.g., output control signals 522a, 522b, 522c, etc.) to set the oscillatory rotations of the respective micro-mirror assemblies 502a, 502b, 502c to have uniform phase and/or amplitude. In some embodiments, each of controllers 510a, 510b, and 510c can receive the different reference signals to, for example, introduce a pre-configured phase difference among the oscillatory rotations of the micro-mirror assemblies 502a, 502b, 502c to suit the need of an application.

In some embodiments, as shown in FIG. 5C, a single controller 510r can be provided to generate an output control signal 522r based on a measurement result of a reference micro-mirror assembly 502r from rotation sensor 508r. The output control signal 522r can be forwarded to multiple micro-mirror assemblies including, for example, micro-mirror assemblies 502b and 502c. Such arrangements can be used when, for example, micro-mirror assemblies 502b and 502c are physically close to reference micro-mirror assembly 502r and likely to have very similar component characteristics (and natural frequency) as reference micro-mirror assembly 502r, such that micro-mirror assemblies 502r, 502b, and 502c can have very similar amplitude and phase response to the same output control signal 522r. Compared with FIG. 5B, the arrangements of FIG. 5C can reduce the number of rotation sensors 508 and controllers 510, which can reduce the space and power of the system.

Figure 5D:
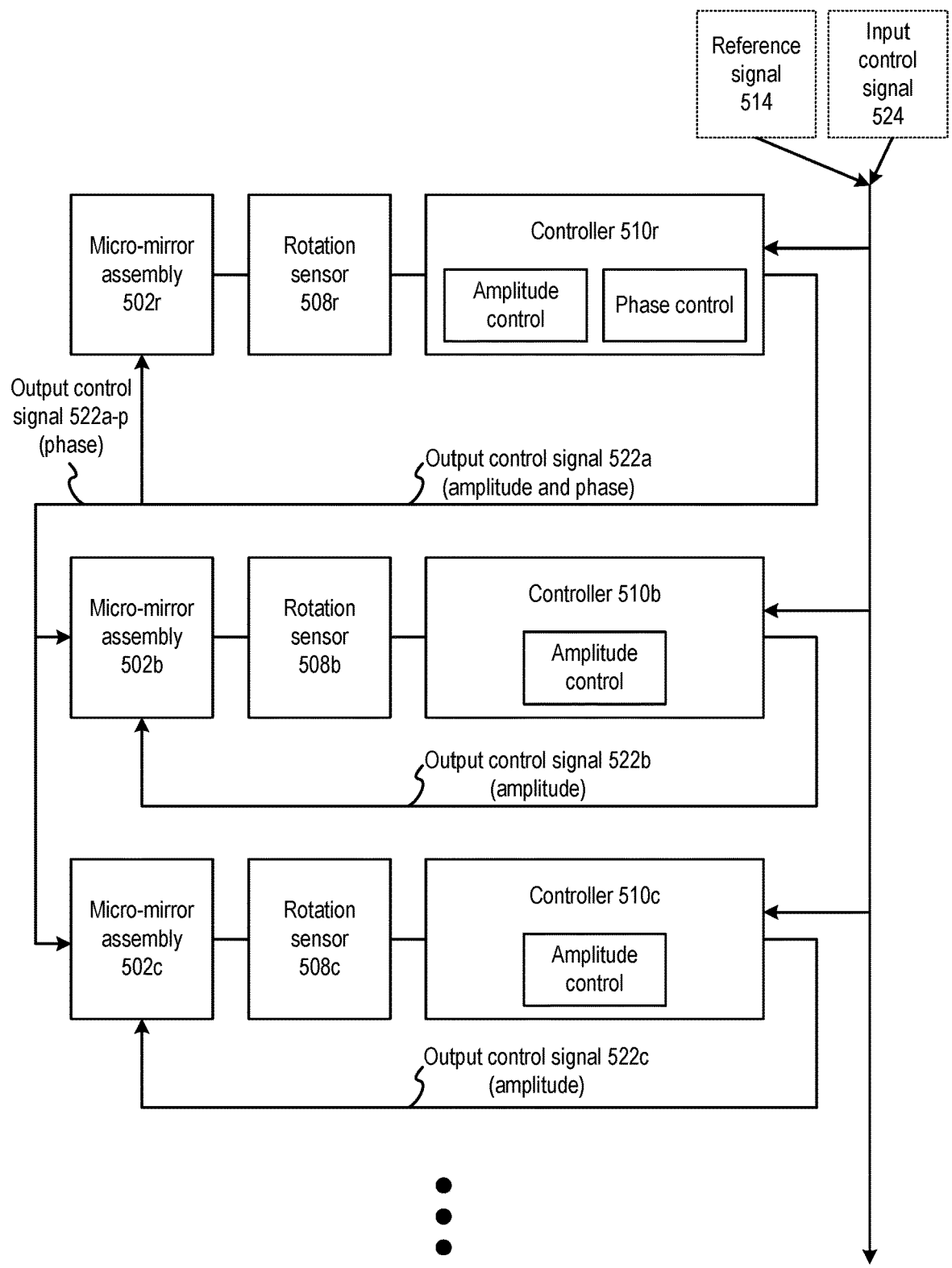

In some embodiments, controllers of different complexities can be provided to synchronize the phase and amplitude of the oscillatory rotation of each respective micro-mirror assembly. Such arrangements can provide a middle-ground solution between FIG. 5B and FIG. 5C to allow trade-off between phase/amplitude accuracies and system power/space. For example, as shown in FIG. 5D, mirror-assembly 502r, rotation sensor 508r, and controller 510r can form a reference loop. Controller 510r can include both amplitude control and phase control circuits (to be described below) and can generate, based on outputs from rotation sensor 508 (e.g., phase and amplitude of rotation measurements), reference signal 514, as well as input signal 524, output control signal 552a to control both the amplitude and the phase of rotation of micro-mirror assembly 502r. Meanwhile, other micro-mirror assemblies, such as micro-mirror assemblies 502b and 502c, are controlled by controllers 510b and 510c which include fewer circuits and take up less space and power. In the example of FIG. 5D, both controllers 510b and 510c include only amplitude control circuits but not phase control circuits. Both controllers 510b and 510c can generate respective output control signals (e.g., output control signals 522b and 522c) based on their respective rotation sensor (e.g., rotation sensors 508b and 508c) outputs and reference signal 514 to control the amplitude of rotation of the respective micro-mirror assemblies 502b and 502c. Each of micro-mirror assemblies 502b and 502c also receives output control signal 522a-p to control the phase of rotation. As the controllers have different complexities, the total size and power of the controllers can be reduced compared with the arrangements of FIG. 5A where each controller includes amplitude and phase control circuits to independently generate the amplitude and phase control signals. Yet the arrangements in FIG. 5D ensures that at least an attribute of the rotations (e.g., one of amplitude or phase) is controlled by independent control loops to reflect the variations between micro-mirror assemblies, which can provide more accurate control of the rotations of the micro-mirror assemblies than the arrangements of FIG. 5C.

Examples of Phase Control System

FIG. 6A illustrates an example of a phase control system that can be part of light steering system 500 of FIG. 5A. As shown in FIG. 6A, light steering system 500 may include a phase controller 610 which can be part of controller 510. Phase controller 610 may include a phase detector 612, a low-pass filter 614, and a voltage-controlled delay line (VCDL) 616. Phase detector 612 and low-pass filter 614 can be part of difference generator 516 of FIG. 5A. Phase detector 612 can receive, from rotation sensor 508, measurement signal 512 of the oscillatory rotation of micro-mirror 504. Measurement signal 512 may indicate an oscillatory rotation of micro-mirror 504. Phase detector 612 can also receive reference signal 514 which can include a target oscillatory rotation having a pre-determined target phase (e.g., a target phase with respect to output control signal 522, a target phase with respect to a reference clock signal, etc.). Phase detector 612 can generate a phase difference 618 between measurement signal 512 and reference signal 514. Low-pass filter 614 can generate a control voltage (VCTRL) 620 based on filtering samples of phase differences 618. VCTRL 620 can set a delay introduced by VCDL 616 between input control signal 524 and output control signal 522.

In FIG. 6A, a feedback loop can be formed to regulate the phase of rotation of micro-mirror 504. For example, if phase detector 612 detects that measurement signal 512 has a phase lead over reference signal 514, a combination of phase detector 612 and low-pass filter 614 can adjust control voltage 620 to add delay to output control signal 522, which can reduce the phase lead of measurement signal 512 over reference signal 514. Moreover, if phase detector 612 detects that measurement signal 512 has a phase lag behind reference signal 514, a combination of phase detector 612 and low-pass filter 614 can adjust control voltage 620 to reduce delay of output control signal 522, which can reduce the phase lag of measurement signal 512 behind reference signal 514. With such arrangements, one or more feedback loops can be implemented to control the oscillatory rotations of multiple micro-mirrors 504 of multiple micro-mirror assemblies 502 to have the same phase (or at least have a fixed phase relationship) with respect to reference signal 514, so that their rotations can be synchronized.

Figure 6B:
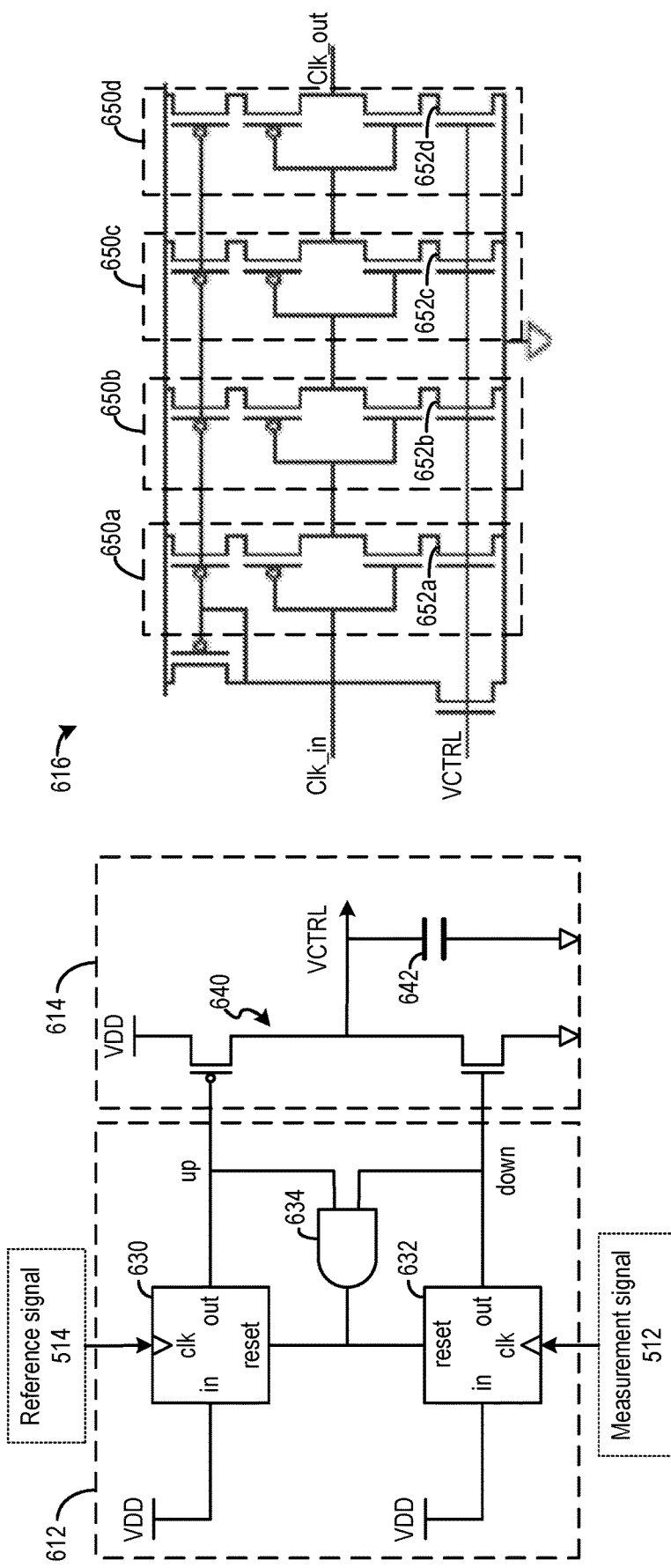

FIG. 6B illustrates examples of internal components of phase detector 612, low-pass filter 614, and VCDL 616. The circuit schematics on the left of FIG. 6B illustrate an example of phase detector 612 and low-pass filter 614. As shown in FIG. 6B, phase detector 612 may include a pair of edge-triggered flip-flops 630 and 632 and an AND gate 634. Both flip-flops 630 and 632 can receive a static voltage (e.g., a power supply VDD voltage) as input. Flip-flip 630 can receive reference clock signal 514 as a clock signal, whereas flip-flop 632 can receive measurement signal 512 as a clock signal. The output signals of both flip flops, labelled "up" and "down" in FIG. 6B, can be input to AND gate 634, whereas the output of AND gate 634 can reset both flip-flops 630 and 632.

Phase detector 612 can generate up and down output signals based on a phase difference between reference signal 514 and measurement signal 512. If reference signal 514 leads measurement signal 512, the up signal can be asserted by flip-flop 630 first, followed by the down signal being asserted by flip-flop 632. The duration of the asserted up signal can correspond to the phase difference. When both up and down signals are asserted, the output of AND gate 634 can become asserted, which can then reset flip-flops 630 and 632 and de-assert the up and down signals. Likewise, if measurement signal 512 leads reference signal 514, the down signal can be asserted, with the duration of the asserted down signal corresponding to the phase difference.

The up and down signals can be transmitted to low-pass filter 614, which can include a charge pump 640 and a capacitor 642. Charge pump 640 can be controlled by the up and down signals to charge or discharge capacitor 642, whereas the control voltage (VCTRL) can reflect a quantity of charge stored in capacitor 642. For example, if the up signal is asserted, charge pump 640 can charge capacitor 642 to increase VCTRL, whereas if the down signal is asserted, charge pump 640 can discharge capacitor 642 to decrease VCTRL. The quantity of charge added/removed by charge pump 640 reflects the phase difference, such that VCTRL is adjusted based on the phase difference.

The circuit schematics on the right of FIG. 6B illustrate an example of VCDL 616. As shown in FIG. 6B, VCDL 616 can include a set of voltage buffers 650a, 650b, 650c, and 650d connected in series, with each voltage buffer introducing a certain delay to the input signal as the input signal propagate through the voltage buffer. Each voltage buffer has a variable current source (e.g., one of 652a, 652b, 652c, 652d, etc.) which can be controlled by VCTRL. A larger current can flow through each voltage buffer with a larger VCTL, which can reduce the delay introduced to the input signal, whereas a smaller VCTL can reduce the current flowing through the voltage buffer and increase the delay. With the combination of phase detector 612, low-pass filter 614, and VCDL 616 of FIG. 6B, the delay of VCDL 616 introduced to output control signal 522 can be reduced when reference signal 514 leads measurement signal 512, to speed up the oscillatory rotation of micro-mirror 504, whereas the delay of VCDL 616 can be increased when measurement signal 512 leads reference signal 514.

Examples of Amplitude Control System

FIG. 7A illustrates an example of an amplitude control system that can be part of light steering system 500 of FIG. 5A. As shown in FIG. 7A, light steering system 500 may include an amplitude controller 710 which can be part of controller 510. Amplitude controller 710 may include an amplitude difference determination module 712 and an amplitude adjustment module 714. Amplitude difference determination module 712 can determine an amplitude/range of rotation of micro-mirror 504 based on measurement signal 514. In some embodiments, as to be described below, amplitude difference determination module 712 can include a digitizer, such as an analog-to-digital converter, a timer, etc., to determine a digital representation of an amplitude/range of rotation of micro-mirror 504 based on measurement signal 514. Amplitude difference determination module 712 can also receive information of a target amplitude/range 713 of rotation of micro-mirror 504 from reference signal 514. Target amplitude/range 713 can also be in digital format. Amplitude difference determination module 712 can include arithmetic circuits to determine an amplitude difference 718 between the amplitude of the oscillatory rotation of micro-mirror 504 and target amplitude/range 713, and forward amplitude difference 713 to amplitude adjustment module 714. Amplitude adjustment module 714 can generate output control signal 522 from input control signal 524 based on amplitude difference 718, and transmit output control signal 522 to actuator 506 to control the amplitude of the oscillatory rotation of micro-mirror 504. The generation of output control signal 522 can be based on adjusting, for example, an amplitude and/or a duty cycle of input control signal 524.

In FIG. 7A, a feedback loop can be formed to regulate the amplitude of the oscillatory rotation of micro-mirror 504. For example, if amplitude difference 718 indicates that the amplitude of the oscillatory rotation of micro-mirror 504 exceeds target amplitude 713, amplitude adjustment module 714 can generate output control signal 522 based on adjusting input control signal 524 to reduce the amplitude of the oscillatory rotation of micro-mirror 504. For example, amplitude adjustment module 714 can generate output control signal 522 based on reducing the amplitude and/or the duty cycle of input control signal 524, to reduce a quantity of energy transferred to micro-mirror 504 (via actuator 506) in each rotation cycle. The reduction in the energy transfer can reduce the amplitude of the oscillatory rotation of micro-mirror 504. Moreover, if amplitude difference 718 indicates that the amplitude of the oscillatory rotation of micro-mirror 504 is below target amplitude 713, amplitude adjustment module 714 can generate output control signal 522 based on adjusting input control signal 524 to increase the amplitude of the oscillatory rotation of micro-mirror 504. The adjustment can be based on, for example, increasing the amplitude and/or the duty cycle of input control signal 524, to increase a quantity of energy transferred to micro-mirror 504 in each rotation cycle. In both cases, the degree of adjustment (in the duty cycle, in the amplitude, etc.) introduced to the input control signal 524 can correspond to the magnitude of amplitude difference 718. With such arrangements, one or more feedback loops can be implemented to control the oscillatory rotations of multiple micro-mirrors 504 of multiple micro-mirrors assemblies 502 to have the same (or almost the same) amplitude as target amplitude 713, so that their rotations can be synchronized.

Figure 7B:
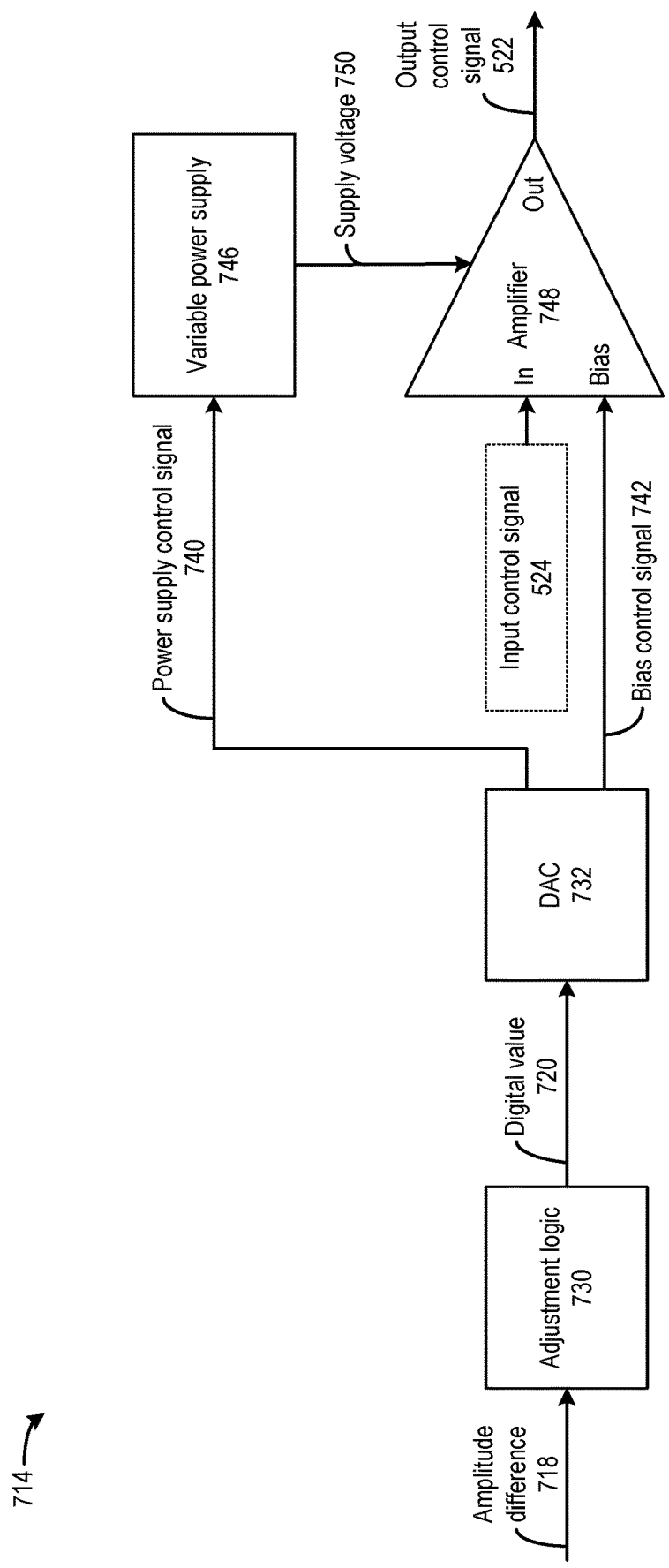
Figure 7C:
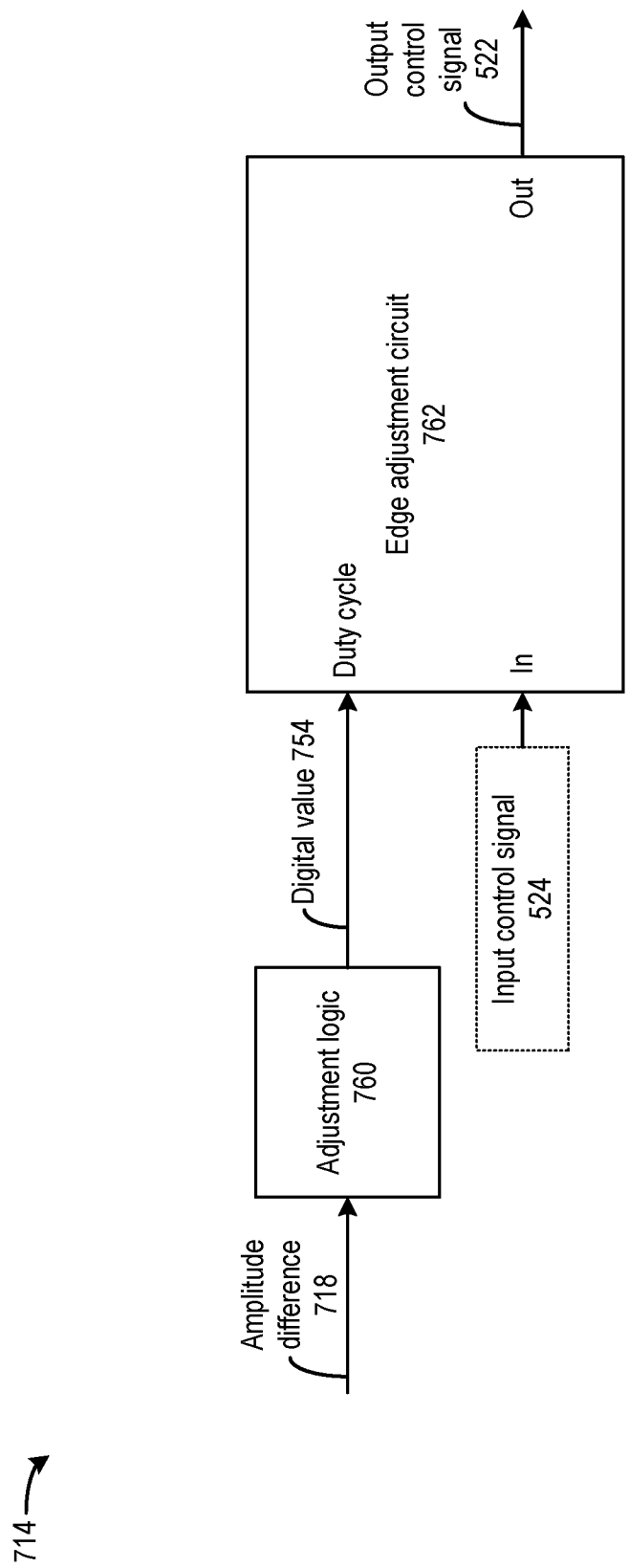

FIG. 7B and FIG. 7C illustrate examples of amplitude adjustment module 714. FIG. 7B illustrates an example of amplitude adjustment module 714 that can generate output control signal 522 based on adjusting the amplitude of input control signal 524. As shown in FIG. 7B, amplitude adjustment module 714 may include adjustment logic 730, a digital to analog converter (DAC) 732, and a variable gain amplifier 734 to generate output control signal 522 based on adjusting the amplitude of input control signal 524. As shown in FIG. 7B, amplitude difference 718 can be in digital form. Adjustment logic 730 can convert amplitude difference 718 to a digital value 720 which can represent, for example, a power supply control signal 740 to set the supply voltage to be supplied to variable gain amplifier 734, a bias signal 742 to be supplied to variable gain amplifier 734, etc. Digital value 720 can be transmitted to DAC 732 to convert to power supply voltage 740 and/or bias voltage 742. Variable gain amplifier 734 may include a variable power supply 746 and an amplifier 748. In some embodiments, variable power supply 746 can include a voltage regulator to generate a supply voltage 750 for amplifier 748 based on power supply control signal 740, and supply voltage 750 can set the amplitude of output control signal 522. In some embodiments, amplifier 748 can adjust its amplification gain based on bias signal 742. Amplifier 748 can scale up or down input control signal 524 to generate output control signal 522 according to the amplification gain, and the scaling can set the amplitude of output control signal 522.

FIG. 7C illustrates an example of amplitude adjustment module 714 that can generate output control signal 522 based on adjusting the amplitude of input control signal 524. As shown in FIG. 7C, amplitude adjustment module 714 can include adjustment logic 760 and edge adjustment circuit 762. Adjustment logic 760 can determine, based on amplitude difference 718, a digital value 754 representing a duty cycle, and provide digital value 754 to edge adjustment circuit 752. Clock edge adjustment 762 can generate output control signal 522 based on adjusting the timing of a transition edge (e.g., one of the rising edge or the falling edge) of input control signal 524 in each cycle to adjust the duty cycle. Various techniques can be employed by clock edge adjustment 762 to adjust the transition edge of input control signal 524 including, for example, introducing different delays to the rising edge and the falling edge in each cycle.

Examples of Phase and Amplitude Control System

In some embodiments, controller 510 may include both phase controller 610 and amplitude controller 710 to regulate both the phase and the amplitude of the oscillatory rotation of micro-mirror 504. Phase controller 610 and amplitude controller 710 can adjust input control signal 524 sequentially. FIG. 8A and FIG. 8B illustrate example arrangements of phase controller 610 and amplitude controller 710 in controller 510. As shown in FIG. 8A, phase controller 610 can adjust the phase of input control signal 524 based on phase difference 618 to generate intermediate control signal 802, and transmit intermediate control signal 802 to amplitude controller 710. Amplitude controller 710 can then adjust at least one of the amplitude or duty cycle of intermediate control signal 802 based on amplitude difference 718 to generate output control signal 522. In some embodiments, as shown in FIG. 8B, amplitude controller 710 can adjust at least one of the amplitude or duty cycle of input control signal 524 based on amplitude difference 718 to generate intermediate control signal 802, and transmit intermediate control signal 802 to phase controller 610. Phase controller 610 can adjust the phase of intermediate control signal 802 based on phase difference 618 to generate output control signal 522.

In both FIG. 8A and FIG. 8B, two feedback loops are included in light steering system 500 to regulate both the phase and amplitude of rotation of micro-mirror 504. To improve loop stability and to facilitate convergence, one of the feedback loops can be disabled initially and can be enabled when the output from the other feedback loop settles to within a certain range. For example, referring to FIG. 8A, if both phase difference 618 and amplitude difference 718 exceed a pre-determined threshold, phase controller 610 can be enabled to adjust intermediate control signal 802 to correct the phase difference, while amplitude controller 710 can be disabled/bypassed, in which case amplitude adjustment module 714 can forward intermediate control signal 802 to actuator 506 as output control signal 522 without adjusting the amplitude or the duty cycle of intermediate control signal 802. After the phase difference 618 settles to within a certain range, which can indicate that the phase control feedback loop is close to reaching the steady state, amplitude controller 710 can be enabled to adjust at least one of the duty cycle or the amplitude of the intermediate control signal 802 to generate output control signal 522. Moreover, referring to FIG. 8B, amplitude controller 710 can be enabled to adjust intermediate control signal 802 to correct the amplitude difference, while phase controller 610 can be disabled/bypassed, in which case VCDL 616 can forward intermediate control signal 802 to actuator 506 as output control signal 522 by introducing a fixed delay to intermediate control signal 802. After the amplitude difference 718 settles to within a certain range, which can indicate that the amplitude control feedback loop is close to reaching the steady state, phase controller 610 can be enabled to adjust the phase of the intermediate control signal 802 to generate output control signal 522.

FIG. 9A-FIG. 9C illustrate an example of rotation sensor 508 and its operations. As shown on the left of FIG. 9A, rotation sensor 508 can be an optical sensor positioned such that it only receives light reflected from micro-mirror 504 when micro-mirror 504 forms an angle α with respect to a reference axis. Rotation sensor 508 can generate a pulse whenever it detects light reflected from micro-mirror 504. As micro-mirror 504 rotates back and forth following an oscillatory pattern, micro-mirror 504 can form angle α at multiple times (e.g., T0, T1, T2, T3, T4, T5, etc.), and rotation sensor 508 can generate a set of pulses 904 at those times.

The set of pulses 904 can be part of measurement signal 512, and can be used by phase detector 612 and amplitude difference determination module 712 to deduce, respectively, a phase difference and an amplitude difference of the oscillatory rotation of micro-mirror 504 with respect to a target rotation of micro-mirror 504. For example, referring to FIG. 9B, reference signal 514 can also include a set of pulses 906 corresponding to rotation angle α when micro-mirror 504 rotates at the target phase. Phase detector 612 can generate the phase difference A based on timing difference between the corresponding pulses (e.g., pulses 904a and pulse 906b) of measurement signal 512 and reference signal 514.

Moreover, amplitude difference determination module 712 can also deduce amplitude difference of the oscillatory rotation of micro-mirror 504 with respect to a target amplitude. For example, referring to the top graph of FIG. 9C, when the amplitude of the oscillatory rotation of micro-mirror 504 equals the target amplitude $\theta_{max}$, micro-mirror 504 can reach angle α at times T0, T1, T2, T3, T4, and T5. The time difference between T0 and T1, T2 and T3, and T4 and T5 equals $T_{\alpha\text{-}target}$. $T_{\alpha\text{-}target}$ can represent the cross-over time it takes for micro-mirror 504 to cross angle α from one end of the oscillatory rotation (e.g., at $\theta_{max}$) and then cross angle α again from an opposite end of the oscillatory rotation (e.g., $-\theta_{max}$). As shown in FIG. 9C, if the amplitude of the oscillatory rotation of micro-mirror 504 is below the target amplitude (e.g., θ'), the cross-over time $T_\alpha$ will reduce compared with $T_{\alpha\text{-}target}$. Moreover, if the amplitude of the oscillatory rotation of micro-mirror 504 is above the target amplitude (not shown in FIG. 9C), the cross-over time will increase compared with $T_{\alpha\text{-}target}$. To determine the amplitude difference between the oscillatory rotation of micro-mirror 504 and the target rotation, amplitude difference determination module 712 can measure the cross-over time $T_\alpha$ between pairs of pulses from rotation sensor 508. $T_\alpha$ can be generated from, for example, a free-running counter that counts between the detections of a pair of pulses. Amplitude difference determination module 712 can also receive $T_{\alpha\text{-}target}$ corresponding to target amplitude 713 as part of reference signal 514. Amplitude difference determination module 712 can determine amplitude difference 718 based on, for example, the difference between $T_\alpha$ and $T_{\alpha\text{-}target}$.

Figure 10A:
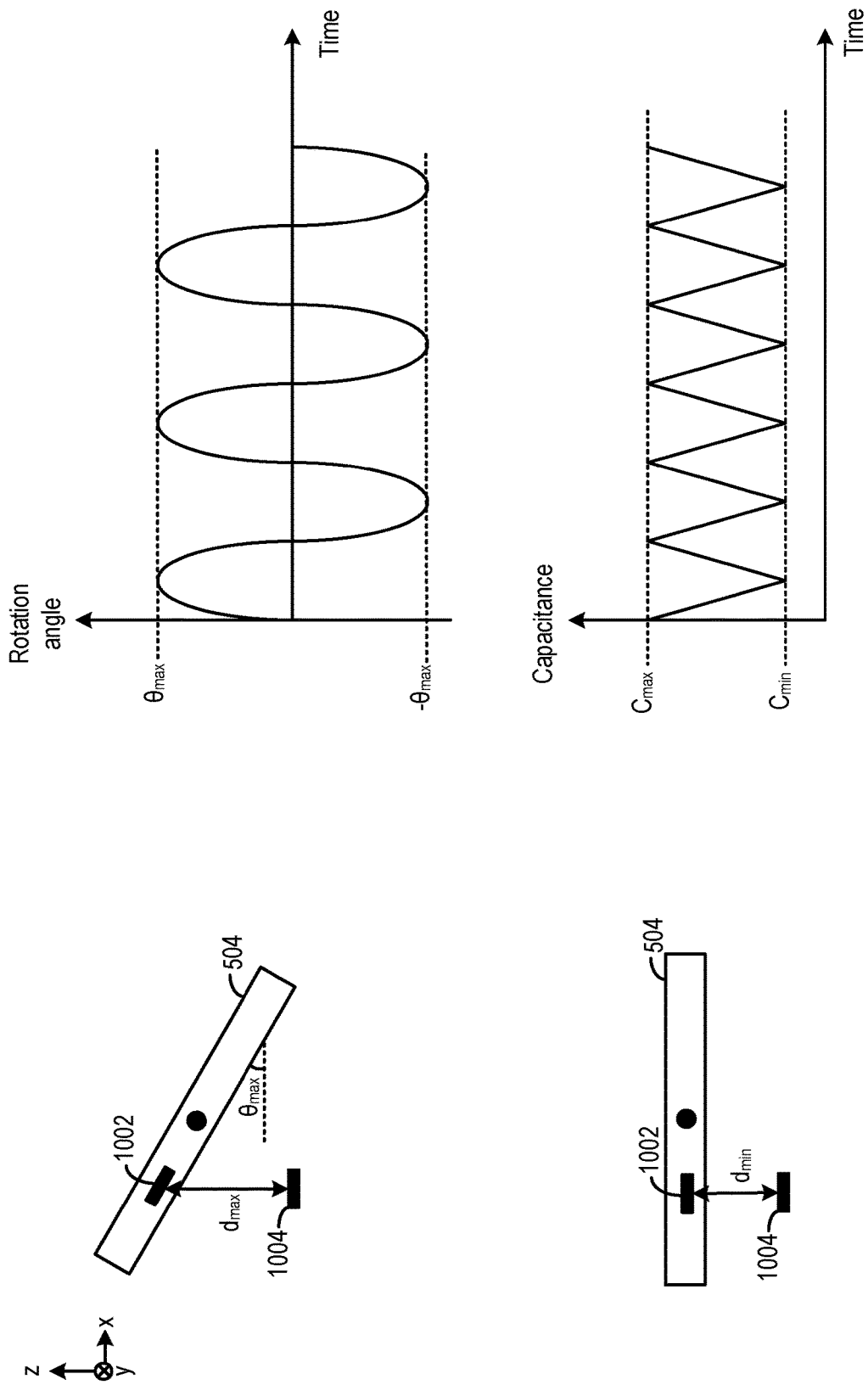
FIG. 10A-FIG. 10C illustrate examples of rotation sensor that can be part of the light steering system of FIG. 5A-FIG. 8B, according to certain embodiments.
Figure 10B:
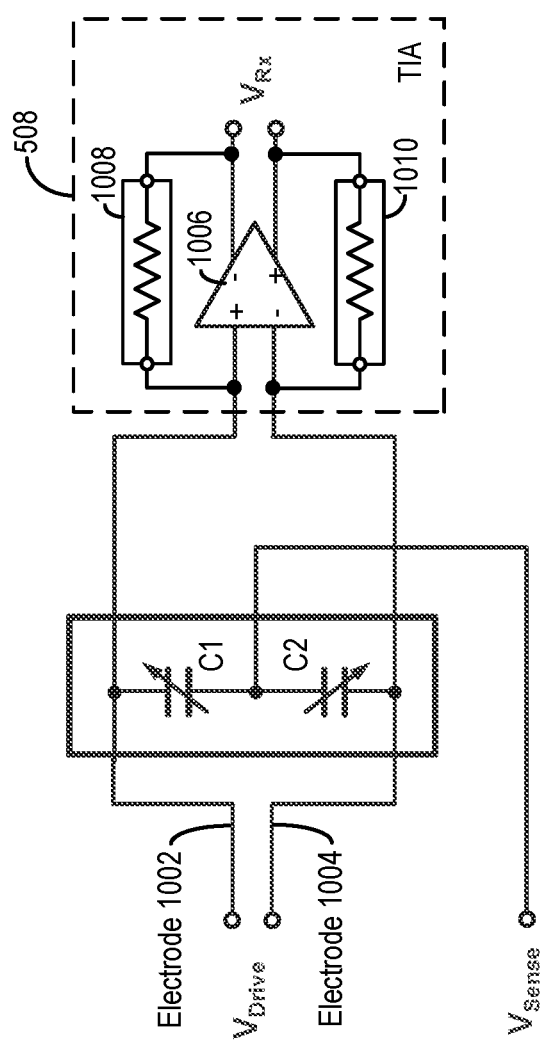

FIG. 10A-FIG. 10B illustrate another example of rotation sensor 508 and its operations. In some embodiments, as shown on the left of FIG. 10A, actuator 506 may include electrostatic devices (e.g., comb drives). The electrostatic devices can include, for example, electrodes 1002 and 1004 that can generate electromagnetic force to attract each other to rotate micro-mirror 504. The capacitance between electrodes 1002 and 1004 can vary with the oscillatory rotation angle of micro-mirror 504. When the oscillatory rotation angle is at the maximum (e.g., $-\theta_{max}$ or $+\theta_{max}$), the separation distance between electrodes 1002 and 1004 can be at the maximum (labelled as "$d_{max}$"), and the capacitance can be at the minimum (labelled as "$C_{max}$"). When the oscillatory rotation angle is at the minimum (e.g., zero), the separation distance between electrodes 1002 and 1004 can be at the minimum (labelled as "$d_{min}$"), and the capacitance can be at the minimum (labelled as "$C_{min}$"). As micro-mirror 504 rotates back and forth following an oscillatory pattern between $-\theta_{max}$ and $+\theta_{max}$, the capacitance between electrodes 1002 and 1004 can also oscillate, as shown on the right of FIG. 10A. Accordingly, the capacitance between electrodes 1002 and 1004 can indicate the oscillatory rotation angle of micro-mirror 504.

Figure 10C:
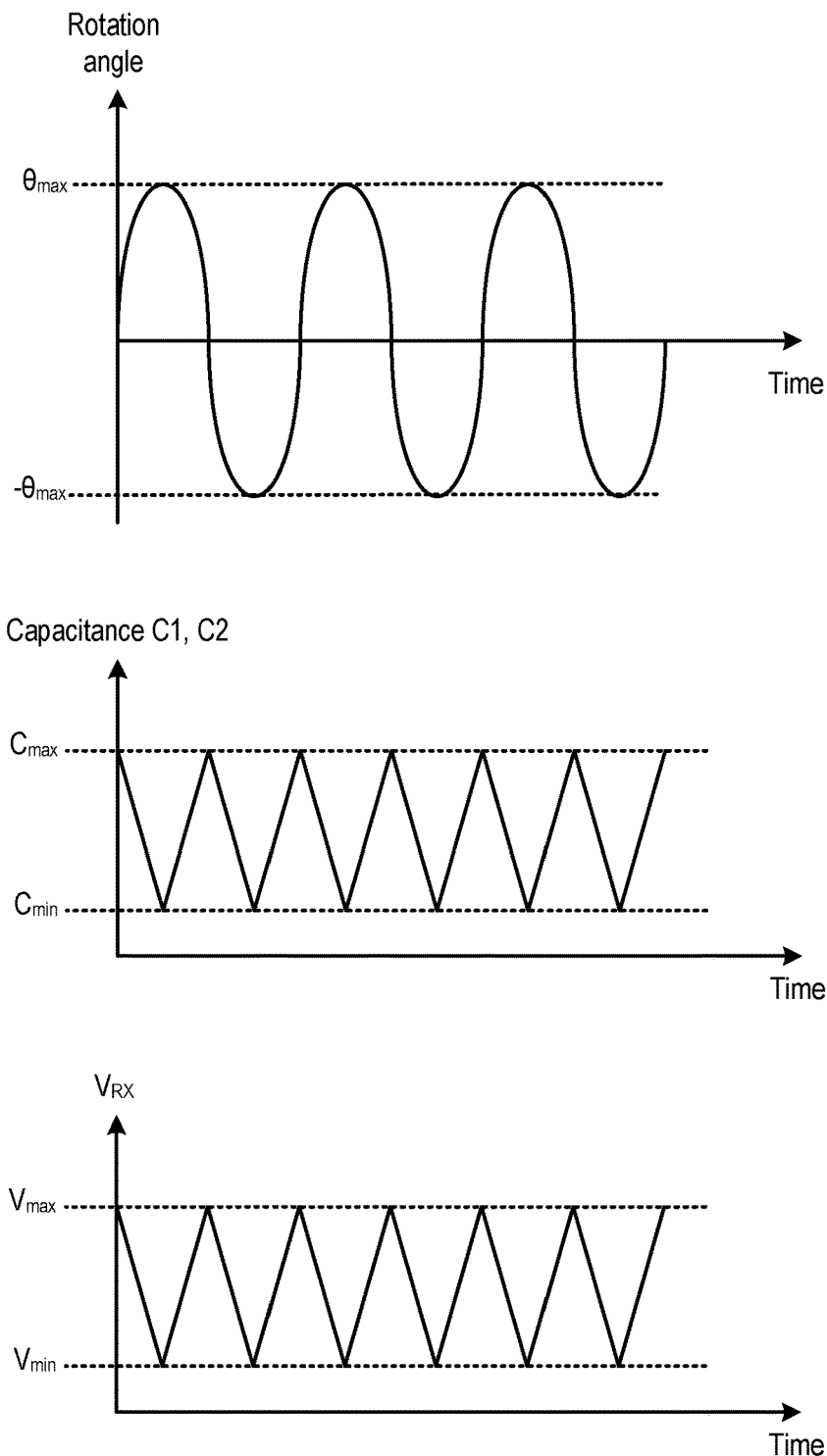

In some embodiments, as shown in FIG. 10C, rotation sensor 508 may include a transimpedance amplifier (TIA) to measure the capacitance between electrodes 1002 and 1004, to determine a pattern of rotation angle of micro-mirror 504 with respect to time. The TIA may include an amplifier 1006 and feedback resistors 1008 and 1010. A third electrode 1020 can be inserted between electrodes 1002 and 1004 to receive an AC input voltage $V_{sense}$, and TIA can generate an output voltage $V_{RX}$ based on $V_{sense}$. The capacitance C1 between electrodes 1002 and 1020, and the capacitance C2 between electrodes 1004 and 1020, track the capacitance between electrodes 1002 and 1004. When capacitances C1 and C2 increases (e.g., when the angle of rotation increases), the impedances of C1 and C2 decrease. The current that flows from $V_{sense}$ into feedback resistors 1008 and 1010 increases, which causes $V_{RX}$ to increase. When capacitances C1 and C2 reduce (e.g., when the angle of rotation decreases), the impedances of C1 and C2 increase, which can reduce the current that flows from $V_{sense}$ into feedback resistors 1008 and 1010, and $V_{RX}$ may decrease. As a result, as shown on the right of FIG. 10C, the variation of $V_{RX}$ with respect to time can track the variation of the capacitances C1 and C2.

The output $V_{RX}$ can be part of measurement signal 512, and can be used by phase detector 612 and amplitude difference determination module 712 to deduce, respectively, a phase difference and an amplitude difference of the oscillatory rotation of micro-mirror 504 with respect to a target rotation of micro-mirror 504. For example, phase detector 612 can determine a phase difference between an oscillatory pattern of $V_{RX}$ and reference signal 514. Moreover, amplitude difference determination module 712 can include an analog-to-digital converter (ADC) to measure the amplitude of $V_{RX}$ to obtain the amplitude of the oscillatory rotation of micro-mirror 504, and compare that with the target amplitude to obtain amplitude difference 718.

Figure 11:
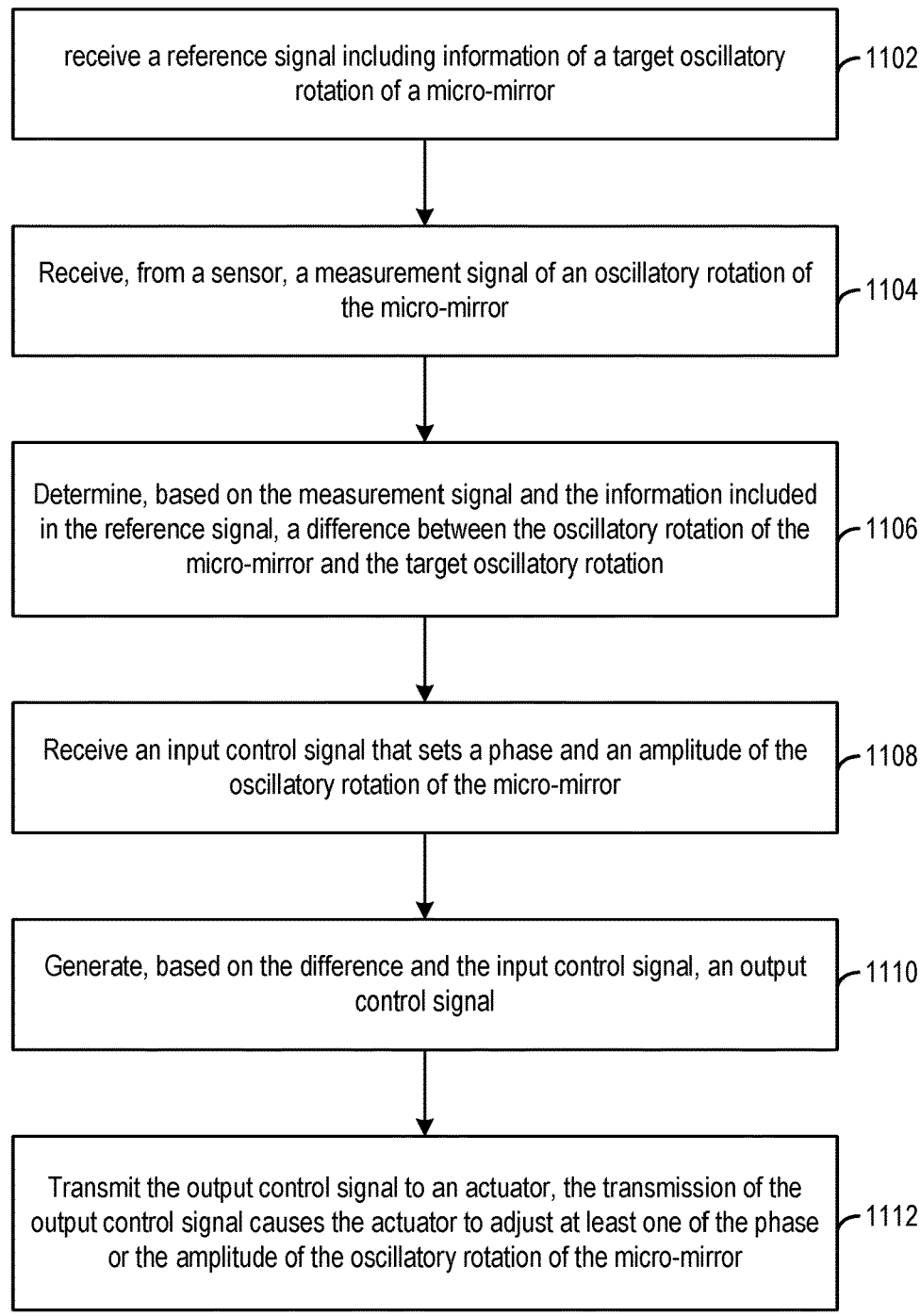
FIG. 11 illustrates an example flowchart of a method of controlling an array of micro-mirrors, according to certain embodiments.

FIG. 11 illustrates a flowchart of an example method 1100 for controlling the rotation of a micro-mirror. Method 1100 can be performed by, for example, light steering system 500 of FIGS. 5A-FIG. 8B which can include controller 510, phase controller 610, and amplitude controller 710. Method 1100 can be performed to synchronize the oscillatory rotations of an array of micro-mirrors and actuators (e.g., actuator 506) which can be microelectromechanical system (MEMS) integrated with controller 510 on a semiconductor integrated circuit. The semiconductor integrated circuit can be part a light steering system with also includes rotation sensors (e.g., rotation sensor 508) to measure the rotations of the micro-mirrors.

Method 1100 starts with step 1102, in which controller 510 receives a reference signal (e.g., reference signal 514) including information of a target oscillatory rotation of the micro-mirror. The reference signal can include, for example, a reference clock signal that defines a target phase of the target oscillatory rotation. The reference signal can also include, for example, information of a target amplitude of the target oscillatory rotation.

In step 1104, controller 510 receives, from the rotation sensor, a measurement signal of the oscillatory rotation of the micro-mirror. The rotation sensor may include, for example, a capacitance measurement sensor, an optical sensor, etc. As described in FIG. 9A-FIG. 10C, the rotation sensor can provide measurement signal indicating, for example, a phase of the oscillatory rotation of the micro-mirror, an amplitude of the oscillatory rotation of the micro-mirror, etc.

In step 1106, controller 510 determines, based on the measurement signal and the information included in the reference signal, a difference between the oscillatory rotation of the micro-mirror and the target oscillatory rotation. For example, controller 510 can determine a phase difference 618 between the reference clock signal of reference signal 514 and the oscillatory rotation of the mirror-mirror as reflected by the measurement signal. Controller 510 can also determine an amplitude difference 718 between the target amplitude and the amplitude of the oscillatory rotation of the mirror-mirror as reflected by the measurement signal.

In step 1108, controller 510 receives an input control signal 524 that sets a phase and an amplitude of the oscillatory rotation of the micro-mirror. The input control signal 524 can be generated from, for example, a phase locked loop (PLL) and have a pre-determined frequency, phase, and amplitude of oscillation.

In step 1110, controller 510 generates an output control signal based on the difference and the input control signal. The output control signal can have the same frequency as the input control signal but with different phase and/or different amplitude set based on, respectively, the phase difference and/or the amplitude difference between the oscillatory rotation of the micro-mirror and the target oscillatory rotation obtained in step 1106. For example, the output control signal can be generated by introducing a phase delay to the input control signal, with the phase delay determined based on the phase difference. The output control signal can also be generated by updating the amplitude of the input control signal.

In step 1112, the output control signal can be transmitted to the actuator, which can adjust at least one of the phase or the amplitude of the oscillatory rotation of the micro-mirror, to minimize the difference between the oscillatory rotation and the target oscillatory rotation.

Computer System

Any of the computer systems mentioned herein may utilize any suitable number of subsystems. Examples of such subsystems are shown in FIG. 12 in computer system 10. In some embodiments, a computer system includes a single computer apparatus, where the subsystems can be the components of the computer apparatus. In other embodiments, a computer system can include multiple computer apparatuses, each being a subsystem, with internal components. A computer system can include desktop and laptop computers, tablets, mobile phones and other mobile devices. In some embodiments, a cloud infrastructure (e.g., Amazon Web Services), a graphical processing unit (GPU), etc., can be used to implement the disclosed techniques, including the techniques described from FIG. 1-FIG. 6.

The subsystems shown in FIG. 7 are interconnected via a system bus 75. Additional subsystems such as a printer 74, keyboard 78, storage device(s) 79, monitor 76, which is coupled to display adapter 82, and others are shown. Peripherals and input/output (I/O) devices, which couple to I/O controller 71, can be connected to the computer system by any number of means known in the art such as input/output (I/O) port 77 (e.g., USB, FireWire®). For example, I/O port 77 or external interface 81 (e.g., Ethernet, Wi-Fi, etc.) can be used to connect computer system 10 to a wide area network such as the Internet, a mouse input device, or a scanner. The interconnection via system bus 75 allows the central processor 73 to communicate with each subsystem and to control the execution of a plurality of instructions from system memory 72 or the storage device(s) 79 (e.g., a fixed disk, such as a hard drive, or optical disk), as well as the exchange of information between subsystems. The system memory 72 and/or the storage device(s) 79 may embody a computer readable medium. Another subsystem is a data collection device 85, such as a camera, microphone, accelerometer, and the like. Any of the data mentioned herein can be output from one component to another component and can be output to the user.

A computer system can include a plurality of the same components or subsystems, e.g., connected together by external interface 81 or by an internal interface. In some embodiments, computer systems, subsystems, or apparatuses can communicate over a network. In such instances, one computer can be considered a client and another computer a server, where each can be part of a same computer system. A client and a server can each include multiple systems, subsystems, or components.

Aspects of embodiments can be implemented in the form of control logic using hardware (e.g., an application specific integrated circuit or field programmable gate array) and/or using computer software with a generally programmable processor in a modular or integrated manner. As used herein, a processor includes a single-core processor, multi-core processor on a same integrated chip, or multiple processing units on a single circuit board or networked. Based on the disclosure and teachings provided herein, a person of ordinary skill in the art will know and appreciate other ways and/or methods to implement embodiments of the present invention using hardware and a combination of hardware and software.

Any of the software components or functions described in this application may be implemented as software code to be executed by a processor using any suitable computer language such as, for example, Java, C, C++, C#, Objective-C, Swift, or scripting language such as Perl or Python using, for example, conventional or object-oriented techniques. The software code may be stored as a series of instructions or commands on a computer readable medium for storage and/or transmission. A suitable non-transitory computer readable medium can include random access memory (RAM), a read only memory (ROM), a magnetic medium such as a hard-drive or a floppy disk, or an optical medium such as a compact disk (CD) or DVD (digital versatile disk), flash memory, and the like. The computer readable medium may be any combination of such storage or transmission devices.

Such programs may also be encoded and transmitted using carrier signals adapted for transmission via wired, optical, and/or wireless networks conforming to a variety of protocols, including the Internet. As such, a computer readable medium may be created using a data signal encoded with such programs. Computer readable media encoded with the program code may be packaged with a compatible device or provided separately from other devices (e.g., via Internet download). Any such computer readable medium may reside on or within a single computer product (e.g., a hard drive, a CD, or an entire computer system), and may be present on or within different computer products within a system or network. A computer system may include a monitor, printer, or other suitable display for providing any of the results mentioned herein to a user.

Any of the methods described herein may be totally or partially performed with a computer system including one or more processors, which can be configured to perform the steps. Thus, embodiments can be directed to computer systems configured to perform the steps of any of the methods described herein, potentially with different components performing a respective steps or a respective group of steps. Although presented as numbered steps, steps of methods herein can be performed at a same time or in a different order. Additionally, portions of these steps may be used with portions of other steps from other methods. Also, all or portions of a step may be optional. Additionally, any of the steps of any of the methods can be performed with modules, units, circuits, or other means for performing these steps.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the disclosure to the specific form or forms disclosed, but on the contrary, the intention is to cover all modifications, alternative constructions and equivalents falling within the spirit and scope of the disclosure, as defined in the appended claims. For instance, any of the embodiments, alternative embodiments, etc., and the concepts thereof may be applied to any other embodiments described and/or within the spirit and scope of the disclosure.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening. The phrase "based on" should be understood to be open-ended, and not limiting in any way, and is intended to be interpreted or otherwise read as "based at least in part on," where appropriate. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate embodiments of the disclosure and does not pose a limitation on the scope of the disclosure unless otherwise claimed. No language in the specification should be construed as indicating any non-claimed element as essential to the practice of the disclosure.

What is claimed is:

1. An apparatus, the apparatus being part of a Light Detection and Ranging (LiDAR) module of a vehicle and comprising:
   a semiconductor integrated circuit comprising a microelectromechanical system (MEMS) and a controller, the MEMS comprising an micro-mirror assembly, the micro-mirror assembly comprising:
  a rotatable micro-mirror connected to a substrate and configured to perform at least one of: reflect light from a light source along an output projection path, or reflect input light propagating along an input collection path to a receiver;
  an actuator controllable by the controller configured to cause the micro-mirror to perform an oscillatory rotation; and
  a sensor configured to generate a measurement signal corresponding to the oscillatory rotation of the micro-mirror; and
  wherein the controller is coupled with the micro-mirror assembly and configured to:
    receive a reference signal including information of a target oscillatory rotation of the micro-mirror;
    receive, from the sensor, the measurement signal of an oscillatory rotation of the micro-mirror;
    determine, based on the measurement signal and the information included in the reference signal, a difference between the oscillatory rotation of the micro-mirror and the target oscillatory rotation;
    receive an input control signal that sets a phase and an amplitude of the oscillatory rotation of the micro-mirror;
    generate, based on the difference and the input control signal, an output control signal associated with at least one of a phase or an amplitude of the oscillatory rotation of the micro-mirror; and
    transmit the output control signal to the actuator, wherein the transmission of the output control signal enables the actuator to adjust at least one of the phase or the amplitude of the oscillatory rotation of the micro-mirror.

2. The apparatus of claim 1, wherein the controller comprises a phase controller, the phase controller comprising:
  a phase detector configured to determine a phase difference between the reference signal and the measurement signal;
  a low pass filter configured to output a control voltage representing the phase difference; and
  a voltage controlled delay line (VCDL) coupled with the low pass filter, the VCDL configured to:
  configure a signal delay based on the control voltage, and generate the output control signal based on introducing the signal delay to the input control signal.

3. The apparatus of claim 2, wherein the low pass filter comprises a charge pump and a capacitor, the charge pump configured to add a quantity charge to the capacitor or to leak charge from the cap based on a polarity of the phase difference, a quantity of charge added or leaked being based on a magnitude of the phase difference; and
  wherein the control voltage is developed at the capacitor.

4. The apparatus of claim 2, wherein the input control signal is generated based on a reference control signal from a phase lock loop (PLL) at a target resonant frequency of the micro-mirror.

5. The apparatus of claim 4, wherein the micro-mirror has a resonant frequency different from the target resonant frequency.

6. The apparatus of claim 1, wherein the controller comprises an amplitude controller configured to:
  determine, from the measurement signal, an amplitude of the oscillatory rotation;
  determine, from the reference signal, a target amplitude of the target oscillatory rotation;
  determine an amplitude difference between the amplitude and the target amplitude; and
  generate the output control signal based on adjusting at least one of a duty cycle or an amplitude of the input control signal.

7. The apparatus of claim 1, wherein the controller comprises a phase controller and an amplitude controller;
  wherein the phase controller is configured to:
    determine a phase difference between the reference signal and the measurement signal, and
    generate an intermediate control signal based on introducing a delay based on the phase difference to the input control signal; and
  wherein the amplitude controller is configured to:
    determine, based on the reference signal and the measurement signal, a amplitude difference between the oscillatory rotation and the target oscillatory rotation; and
    determine the output control signal based on adjusting at least one of adjusting at least one of a duty cycle or an amplitude of the intermediate control signal.

8. The apparatus of claim 7, wherein the amplitude controller is configured not to adjust the duty cycle or the amplitude of the intermediate control signal until the phase difference falls within a pre-determined range.

9. The apparatus of claim 1, wherein the controller comprises a phase controller and an amplitude controller;
  wherein the amplitude controller is configured to:
    determine, based on the reference signal and the measurement signal, a amplitude difference between the oscillatory rotation and the target oscillatory rotation; and
    determine an intermediate control signal based on adjusting at least one of adjusting at least one of a duty cycle or an amplitude of the input control signal; and
  wherein the phase controller is configured to:
    determine a phase difference between the reference signal and the measurement signal, and
    generate the output control signal based on introducing a delay based on the phase difference to the intermediate control signal.

10. The apparatus of claim 9, wherein the phase controller is configured not to introduce the delay based on the phase difference to the intermediate control signal until the amplitude difference falls within a pre-determined range.

11. The apparatus of claim 1, wherein the sensor comprises an optical sensor configured to:
  receive light reflected from the micro-mirror when the micro-mirror rotates by a first rotation angle; and
  output a pulse responsive to receiving the light;
  and wherein the measurement signal comprises the pulses output by the optical sensor at different times.

12. The apparatus of claim 11, wherein the controller is configured to:
  determine a phase difference between the pulses and the reference signal; and
  generate, based on the phase difference and the input control signal, the output control signal to control the phase of the oscillatory rotation of the micro-mirror.

13. The apparatus of claim 11, wherein the controller is configured to:
  determine an amplitude of the oscillatory rotation based on a time difference between pairs of the pulses;

determine, based on the reference signal, an amplitude difference between the amplitude and a target amplitude of the target oscillatory rotation; and generate, based on the amplitude difference and the input control signal, the output control signal to control the phase of the oscillatory rotation of the micro-mirror.

14. The apparatus of claim 1, wherein a capacitance of the actuator varies with an angle of rotation of the micro-mirror; and wherein the sensor is configured to generate the measurement signal based on measuring the capacitance of the actuator.

15. The apparatus of claim 14, wherein the actuator comprises a transimpedance amplifier, the transimpedance amplifier including a feedback resistor and configured to generate the measurement signal based on a relationship between an impedance of the capacitance of the actuator and a resistance of the feedback resistor.

16. The apparatus of claim 1, wherein:
the controller is a first controller;
the measurement signal is a first measurement signal;
the difference is a first difference;
the output control signal is a first output control signal;
the micro-mirror assembly is a first micro-mirror assembly;
the MEMS comprises a micro-mirror assembly array comprising the first micro-mirror assembly and a second micro-mirror assembly, the second micro-mirror assembly comprising a second rotatable micro-mirror, a second actuator, and a second sensor;
the apparatus further comprises a second controller coupled with the second micro-mirror assembly and configured to:
receive the reference signal;
receive, from the second sensor, a second measurement signal of an oscillatory rotation of the second micro-mirror;
determine, based on the second measurement signal and the information included in the reference signal, a second difference between the oscillatory rotation of the second micro-mirror and the target oscillatory rotation;
receive the input control signal;
generate, based on the second difference and the input control signal, a second output control signal to control at least one of a phase or an amplitude of the oscillatory rotation of the second micro-mirror; and
transmit the second output control signal to the second actuator.

17. The apparatus of claim 1, wherein:
the micro-mirror assembly is a first micro-mirror assembly;
the MEMS comprises a micro-mirror assembly array comprising the first micro-mirror assembly and a second micro-mirror assembly, the second micro-mirror assembly comprising a second rotatable micro-mirror and a second actuator; and
the controller is configured to transmit the output control signal to the second actuator to control at least one of a phase or an amplitude of the oscillatory rotation of the second micro-mirror.

18. A method comprising:
receiving a reference signal including information of a target oscillatory rotation of a micro-mirror, the micro-mirror being part of a microelectromechanical system (MEMS) of a Light Detection and Ranging (LiDAR) module of a vehicle;
receiving, from a sensor, a measurement signal of an oscillatory rotation of the micro-mirror;
determining, based on the measurement signal and the information included in the reference signal, a difference between the oscillatory rotation of the micro-mirror and the target oscillatory rotation;
receiving an input control signal that sets a phase and an amplitude of the oscillatory rotation of the micro-mirror;
generating, based on the difference and the input control signal, an output control signal; and
transmitting the output control signal to an actuator coupled with the micro-mirror, wherein the output control signal controls the actuator to adjust at least one of the phase or the amplitude of the oscillatory rotation of the micro-mirror.

19. The method of claim 18, further comprising:
determining a phase difference between the oscillatory rotation of the micro-mirror and the target oscillatory rotation;
determining an amplitude difference between the oscillatory rotation of the micro-mirror and the target oscillatory rotation; and
generating the output control signal based on the phase difference and the amplitude difference, wherein the output control signal controls the actuator to set the phase and the amplitude of the oscillatory rotation of the micro-mirror.

20. The method of claim 18, wherein the sensor comprises at least one of: an optical sensor, or a transimpedance amplifier that senses a capacitance of the actuator.

* * * * *